US008839133B2

(12) United States Patent
Abeln et al.

(10) Patent No.: US 8,839,133 B2
(45) Date of Patent: Sep. 16, 2014

(54) DATA VISUALIZATIONS INCLUDING INTERACTIVE TIME LINE REPRESENTATIONS

(75) Inventors: Christian Olaf Abeln, Helsingborg (SE); Christian Rytt, Dronningmolle (DK)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 12/959,243

(22) Filed: Dec. 2, 2010

(65) Prior Publication Data

US 2012/0144335 A1    Jun. 7, 2012

(51) Int. Cl.
*G06F 3/048* (2013.01)
*G06Q 10/06* (2012.01)
*G06Q 10/08* (2012.01)

(52) U.S. Cl.
CPC .............. *G06Q 10/06* (2013.01); *G06Q 10/087* (2013.01)
USPC ........................................................ 715/771

(58) Field of Classification Search
CPC ....................................................... G06F 17/30
USPC ........................................................ 715/771
See application file for complete search history.

(56) References Cited

U.S. PATENT DOCUMENTS

| | | | |
|---|---|---|---|
| 6,577,304 B1 | 6/2003 | Yablonski et al. | |
| 6,995,768 B2 | 2/2006 | Jou | |
| 7,287,234 B2 | 10/2007 | Leah | |
| 7,639,256 B1 * | 12/2009 | Yablonski et al. | ............ 345/440 |
| 2002/0070953 A1 * | 6/2002 | Barg et al. | ...................... 345/700 |
| 2003/0071814 A1 * | 4/2003 | Jou et al. | ........................ 345/440 |
| 2006/0004617 A1 | 1/2006 | Najmi et al. | |
| 2006/0112123 A1 | 5/2006 | Clark et al. | |
| 2007/0067211 A1 * | 3/2007 | Kaplan et al. | .................... 705/10 |
| 2007/0208608 A1 * | 9/2007 | Amerasinghe et al. | ......... 705/10 |
| 2008/0103863 A1 * | 5/2008 | Holm-Petersen | ................. 705/8 |
| 2008/0120573 A1 | 5/2008 | Gilbert | |
| 2008/0266297 A1 | 10/2008 | Leah | |
| 2009/0002370 A1 | 1/2009 | Helfman | |
| 2009/0172511 A1 * | 7/2009 | Decherd et al. | ............... 715/207 |
| 2009/0300528 A1 * | 12/2009 | Stambaugh | ................... 715/764 |
| 2010/0162152 A1 | 6/2010 | Allyn | |
| 2010/0295856 A1 | 11/2010 | Ferreira et al. | |
| 2011/0214050 A1 * | 9/2011 | Stambaugh | ................... 715/234 |

OTHER PUBLICATIONS

Demo presented at Directions '09 Conference in Austin, Texas. See Christian Abeln blog of Nov. 16, 2009, listed herein.

(Continued)

*Primary Examiner* — William Bashore
*Assistant Examiner* — Henry Orr
(74) *Attorney, Agent, or Firm* — Damon Rieth; Jim Ross; Micky Minhas

(57) ABSTRACT

Interactive data visualization features are provided, including an interactive graphical data representation, but the embodiments are not so limited. An exemplary computer-implemented method provides an interactive data visualization interface that includes a graphical time line representation and a number of visual change indicators used in part to provide symbolic cues and highlight changes made to adjustable aspects of the graphical time line representation. An exemplary computing architecture includes at least one client and server including a data communication interface used in part to provide visualization data to display an interactive time line representation as part of providing an interactive data visualization tool. Other embodiments are included and available.

20 Claims, 21 Drawing Sheets

(56) References Cited

OTHER PUBLICATIONS

"Resources for my DynamicsNAV Client Extensibility sessions at Directions 09 in Austin, Tx" blog posted by Christian Abeln, MSDN, Nov. 16, 2009, 4 pages. Demo shown as well. http://blogs.msdn.com/b/cabeln/archive/2009/11/16/resources-to-my-add-in-sessions-at-directions-09-in-austin-tx.aspx.

"Announcement: Treemap Business Data Visualization available on PartnerSource and CustomerSource" blog posted by Christian Abeln, MSDN, Dec. 5, 2009, 3 pages.

"Client Extensibility (Part 1) Introduction" Christian Abeln. Nov. 2009.

"Client Extensibility (Part 2) Creating Add-ins" Christian Abeln. Nov. 2009.

"Auto deployment of Client Side Components" Freddys Blog. Freddy Kristiansen. Sep. 19, 2009 http://blogs.msdn.com/b/freddyk/archive/2009/09/19/auto-deployment-of-client-side-components.aspx.

"ezViz Office" Files32.com, © 1999-2010, 3 pages.

"Visual Analytics Dashboards for Finance Telecoms Industry and Government" © 2010 Panopticon Software, 2 pages.

"Performance Dashboard" based on *Performance Dashboards: Measuring, Monitoring, and Managing Your Business* by Wayne Eckerson (John Wiley & Sons, 2005); 2 pages.

"Many Eyes: Treemaps" by IBM Research and the IBM Cognos software group accessed at: http://manyeyes.alphaworks.ibm.com/manyeyes/pageTreemap.html; accessed on Sep. 23, 2010; 3 pages.

Monitor Trade Activity and Enterprise Risk with Visual Business Intelligence Tools—Published Date: Jun. 2008 http://www.panopticon.com/assets/pdf/appnote_trade_monitoring.pdf.

Data Visualization: Market Landscape Report—Published Date: 2009 http://www.dashboardinsight.com/CMS/127a78af-82ff-4e91-a183-24ce58b9189d/MLR.pdf.

Effective Information Visualization Guidelines and Metrics for 3D Interactive Representations of Business Data—Published Date: 1999 http://www3.sympatico.ca/blevis/thesis49observations.html.

Using Oculus.NET For Your Business Data Visualization Solutions—2007—Retrieved Date: Sep. 8, 2010 http://www.oculusinfo.com/papers/OculusDotNet_Whitepaper.pdf.

"The Interactive Map Meets the Data Visualization Needs of the 21st Century" Buzzle.com. Joe Miller—Retrieved Date: Sep. 8, 2010. 2 pages. http://www.buzzle.com/editorials/6-23-2005-72035.asp.

Silverlight Data Visualization Zoombar Control—Retrieved Date: Sep. 8, 2010 http://www.infragistics.com/dotnet/netadvantage/silverlight/data-visualization/xamwebzoombar.aspx#Overview.

Chintalapani G. Plaisant C and Shneiderman B. "Extending the utility of treemaps with flexible hierarchy." In Proceedings of the 8th International Conference on Information Visualisation. Jul. 2004. pp. 335-344. [retrieved on Jan. 10, 2013]. Retrieved from the Internet: URL: http://www.cs.umd.edu/~ben/papers/Chintalapani2004Extending.pdf.

Office Action mailed Jan. 15, 2013, in co-pending U.S. Appl. No. 12/955,870.

* cited by examiner

| Node Name | Node Type | Source Type | Data Source |
|---|---|---|---|
| DocumentElement | Element | Text | <DocumentElement> |
| Uniqueness | Attribute | Text | Uniqueness |
| VizTitle | Attribute | Text | VizTitle |
| ItemName | Attribute | Text | VizItemName |
| MinAutoAdjustLevel | Attribute | Text | MinAutoAdjustLevel |
| LegendSeriesTitle1 | Attribute | Text | LegendSeriesTitle1 |
| LegendSeriesTitle2 | Attribute | Text | LegendSeriesTitle2 |
| LegendSeriesTitle3 | Attribute | Text | LegendSeriesTitle3 |
| Transaction | Element | Table | Transactions(Timeline Eve... |
| RefNo | Element | Field | Transactions::ID |
| ChangeRefNo | Element | Field | Transactions::ChangeRefNo |
| TransactionType | Element | Field | Transactions::Transaction Type |
| Description | Element | Field | Transactions::Description |
| OriginalDate | Element | Field | Transactions::Original Date |
| NewDate | Element | Field | Transactions::New Date |
| OriginalQuantity | Element | Field | Transactions::Original Quantity |
| NewQuantity | Element | Field | Transactions::New Quantity |
| SpecialDate | Element | Table | SpecialDates(Timeline Spe... |
| Date | Element | Field | SpecialDates::Date |
| Caption | Element | Field | SpecialDates::Caption |
| SpecialValue | Element | Table | SpecialValues(Timeline Sp... |
| Value | Element | Field | SpecialValues::Value |
| Caption | Element | Field | SpecialValues::Caption |
| Color | Element | Field | SpecialValues::Color |

*FIGURE 2D*

| Node Name | Node Type | Source... | Data Source |
|---|---|---|---|
| DocumentElement | Element | Text | <DocumentElement> |
| TransactionChanges | Element | Table | TransactionChanges(Time... |
| RefNo | Element | Field | TransactionChanges::Referen... |
| ChangeRefNo | Element | Field | TransactionChanges::Change... |
| Changes | Element | Field | TransactionChanges::Changes |
| OriginalDate | Element | Field | TransactionChanges::Original ... |
| NewDate | Element | Field | TransactionChanges::New Date |
| OriginalQuantity | Element | Field | TransactionChanges::Original ... |
| NewQuantity | Element | Field | TransactionChanges::New Qu... |

*FIGURE 2E*

<> Document Element

Input data for the Timeline visualization. These contain a table
For transaction, speacial values, speacial dates and a number o...

@ Uniqueness                                          xs:string

Set a unique value (e.g., increasing number) in order to make a
   document unique compared to a previously sent document...

@ VizTitle                                             xs:string

Set a title string that appears above the chart area at the top of
   the visualization @ ItemName                                             xs:string Set an item name that appears behind the title above the chart
   area at the top of the visualization @ MinAutoAdjustLevel                                   xs:string Specify the minimum level an item can take when the user
   selects 'Auto Adjust'. The default it zero.

@ LegendSeriesTitle1                                   xs:string

Use this to send a string to the first checkbox representing the
   first scenario in the visualization @ LegendSeriesTitle2                                   xs:string Use this to send a string to the second checkbox representing
   the second scenario in the visualization @ LegendSeriesTitle3                                   xs:string Use this to send a string to the third checkbox representing the
   third scenario in the visualization <> Transaction A list of transactions that influence the level of the visualized
   measure, together with changes in amount and schedule <> SpecialDate A list of special dates shown as vertical background area for a
   day with a vertical title caption <> SpecialValue A list of special values shown as horizontal colored background
   lines with a horizontal title caption

DATA VISUALIZATIONS INCLUDING INTERACTIVE TIME LINE REPRESENTATIONS

BACKGROUND

Important business decisions often revolve around comprehension of complex data sets in the context of some business goal. For example, a company may use database and spreadsheet applications to track profitable and unprofitable assets over a particular calendar year using multidimensional sets of data that may include partner data, customer data, or other information. Video processing methods and rendering programs provide algorithms that can process multiple dimensions of a complex data set as part of rendering a visualization. For example, a user may use a visualization of a projected trend in attempts to understand the highly complex nature of the vast numbers of values to track or plot. Data reduction methods can be used to reduce the complex data by creating new dependent variables. For example, sales and expense data can be reduced and visualized in terms of profit or loss which may be more meaningful to the end-user. However, many of the available applications are limited to pre-set interface control types and static user interaction features.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide interactive data visualization features, including an interactive graphical data representation, but the embodiments are not so limited. In an embodiment, a computer-implemented method provides an interactive data visualization interface that includes a graphical time line representation and a number of visual change indicators used in part to provide symbolic cues and highlight changes made to adjustable aspects of the graphical time line representation. In one embodiment, a computing architecture includes at least one client and server including a data communication interface used in part to provide visualization data to display an interactive time line representation as part of providing an interactive data visualization tool. Other embodiments are included and available.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 2A-2I depict aspects of an exemplary client-server based visualization environment.

DETAILED DESCRIPTION

Figure 1:
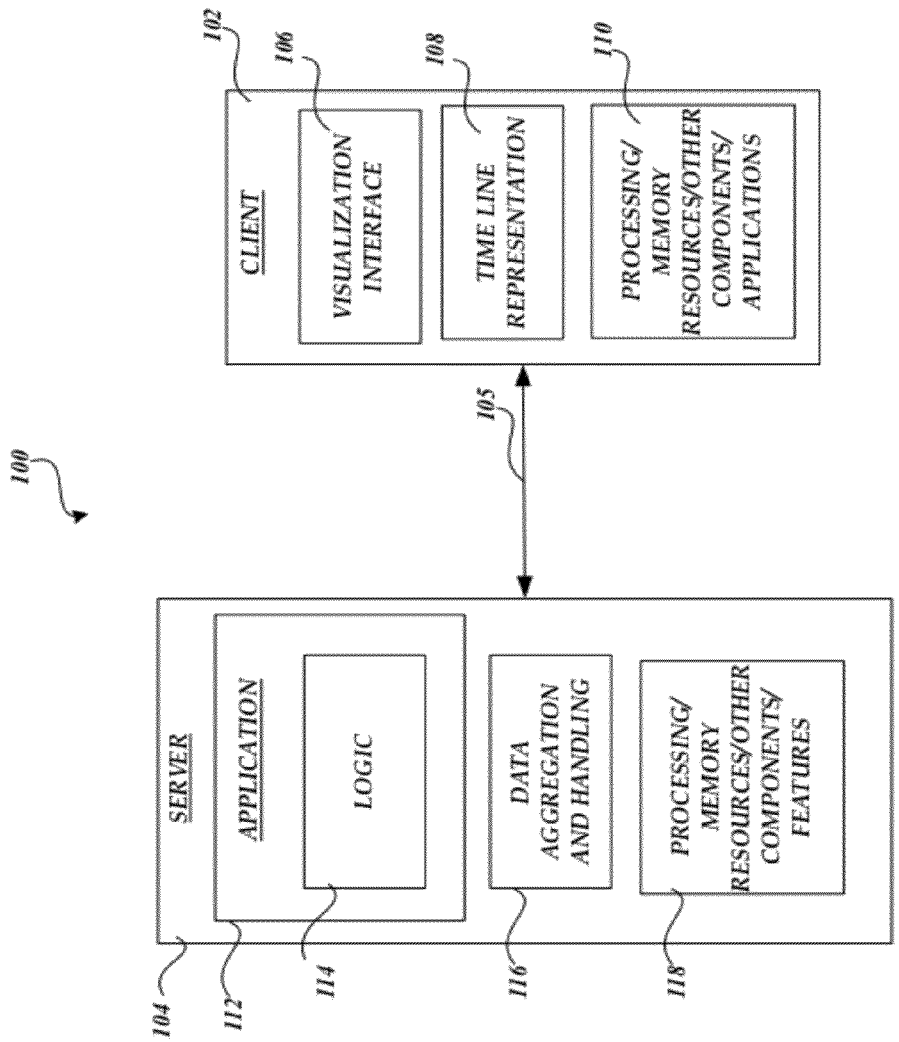
FIG. 1 is a block diagram of an exemplary system.

FIG. 1 is a block diagram of an exemplary system 100 that includes data processing, video processing, memory, and/or other components that provide data visualization and other features, but the embodiments are not so limited. As described below, components of the system 100 can operate to provide interactive time line data visualizations used in part to analyze business and other data. For example, components of the system 100 can operate to provide an interactive time line graphical representation for analyzing different types of data by providing additional interactive control to gain further insight using different data perspectives to identify data outliers, actionable items, and/or other relevant visualization events.

In one embodiment, components of the system 100 provide time line visualizations using aggregations of data to populate time line portions and/or list content, wherein time line portions can include representative step portions including positive, zero, and/or negative step portions which represent aspects of aggregated data, wherein adjustable points of one or more step portions can be further characterized and/or transitioned using adjustment controls and/or one more visual change indicators. An interactive graphical data representation of one embodiment can be used to replace a typical list-type representation for users, including the use of adjustable step line portions and/or visualization symbols to enhance interpretative analysis operations by providing effective feedback to a user.

As described below, in an embodiment, components of the system 100 provide a visual model to analyze a number of transactions over time in context of a resulting level, including providing visual comparison of multiple scenarios, taking into account only selected types of transactions. For example, the components of the system 100 can be used to provide visual indication of certain issues, such as when a step line level falls below zero for example. The system 100 of one embodiment includes a client server data communication pipeline to provide interactive modification of transactions in time (e.g., rescheduling an order, shipment, stock purchase, sale, etc.) and amount, as part of visualizing consequences using a graphic illustration of level changes without having to actually execute the business transactions (e.g., running an example scenario instead). The time line representation presentation can be used to visually highlight interactive user changes, which can be aggregated as feedback over the communication pipeline to associated logic (e.g., business logic).

As described below, the system 100 of an embodiment includes time line visualization features integrated with underlying business logic. For example, an enterprise can use a resource planning computing architecture to aggregate, organize, and provide insight to business data, including using interactive time line representations and visual controls to gain insight into the aggregated data. In one embodiment, graphical data representation and/or control features can be provided as a program add-in, including a server-side object, a codeunit for data processing, and/or other features.

Exemplary business data visualizations can be used, but are not limited to: picture aspects of a business by providing a mental model for business data and data dependencies using a visual representation; understand fundamentals of a business, including state and trend data using visualizations as an entry point for understanding the current state of a business and trends; drill-down into aspects of the data to provide intuitive, ad hoc analysis; provide knowledge to act (e.g., identify actionable tasks), including identifying items of interest and outliers in business data that are based on certain objectives or measures (e.g., converting certain outliers into high-priority actionable tasks and possible actions); act wisely by providing decision support, problem solvers, and optimization based on a given strategy, including providing suggestions for an action strategy that can lead to an optimal result for one or more objectives; understand consequences using visualizations to understand impacts of actions before committing the action or actions by accounting for dependencies; predict an outcome of a series of actions; etc.

Exemplary use of components of the system 100 can provide graphical data representation interfaces for gaining insight into business data, such as trends and questionable products and/or services by viewing business data from different perspectives and interactive states. In an embodiment, a graphical data representation includes a step line perspective of one or more types of data. As an example, a user can use an interactive step line graphical data representation and one or more visual change indicators to efficiently analyze large amounts of data over some time period. Correspondingly, a user can follow and keep track of dynamic changes for a large number of visual elements simultaneously as part of providing an effective data visualization interface. Users can use the visual tools to better understand a set of business objects over some quantifiable period of time, resulting in the discovery of unexpected correspondences, while validating data following presumed or predicted correspondences.

A graphical data representation interface can be used to identify actionable items and answers to questions, such as identifying: data items that fall out of typical procedures; data items most and/or least important to act on; and/or how an action produces the most and/or least impact as a few illustrative examples. Using the interactive features, business questions can be answered by looking at outliers of certain presumed correspondences of events for various business situations. For example, a visualization interface can be populated with a time line representation that includes highlighting negative outliers as part of identifying an impact to a business based in part on some user change. Accordingly, a visualization interface can be used to highlight and draw attention to data items that may not typically follow the presumed correspondences and/or anticipated flow of data. The graphical data representation interface of one embodiment provides direct access to relevant user interface (UI) pages so that users can act on the business data object behind a time line portion or step.

As shown in FIG. 1, the system 100 of one embodiment includes a client computing device or system 102 (referred to as client 102) and a server 104, but is not so limited. The client 102 of an embodiment includes a visualization interface 106 including a time line representation component 108, and processing, memory, and/or other application resources 110, including a cache for storing time line data and other information. In one embodiment, the server 104 and client 102 use data and view models to provide an interactive time line data visualization using the visualization interface 106. The client 102 can also include other applications and/or input/output features, such as data processing, video processing, and/or networking features as examples. It will be appreciated that a display can be used to display the visualization interface 106 including associated interactive time line visualizations. As described below, the client 102 can interact with the server 104 using a communication channel 105 to provide dynamic interactive visualizations using multidimensional data aggregations including using a visually distinct time line representation and associated visual change indicators and/or controls to control rendering of the time line representation. The communication channel 105 of one embodiment includes one or more communication channels or ports to exchange information between the client 102 and server 104.

The server 104 of an embodiment includes a multidimensional data resource planning application architecture, which can include physical and virtual components and configurations. As shown in FIG. 1, the server 104 of one exemplary embodiment includes application 112 including logic 114, a data aggregation and handling component 116, and/or other components and features 118. For example, the server 104 can include a number of networked components to efficiently process and handle data, metadata, and other information using various data aggregations to provide visualization data for consumption by client 102, including processing change information associated with user interactions with a particular time line visualization, as described below. In one embodiment, the server 104 can receive data changes including changes associated with updated and/or modified data resulting from use of one or more adjustable data points of an interactive time line representation from the client 102 over the communication channel 105. It will also be appreciated that various functionalities and/or features can be combined and further subdivided based in part on a particular visualization implementation.

In one embodiment, data communication between the client 102 and server 104 uses a data exchange mechanism composed in part of view descriptions of an underlying interactive time line representation. The system 100 of an embodiment provides an interactive time line interface that enables users to visually analyze and interact with business entity and other data from different perspectives using portions of one or more interactive step line representations that can be used to quantify different types of data simultaneously in a comparing manner. The visual representation translates into a mental model for users when performing certain tasks using data. The user can populate an interactive time line data representation with data based in part on selection of one or more types of display data. For example, a user can populate an interactive time line data representation with booked transaction data, changes data, and/or forecast data, whether set by associated business logic or modified by an end user.

In one embodiment, the system 100 includes a dedicated server including a .NET-based Windows Service application that communicates with one or more database servers (e.g., SQL server databases), including a communication framework protocol to process client requests. In an embodiment, business logic runs on the dedicated server instead of on the client. In another embodiment, client and server components cooperate in accordance with implemented business logic. The dedicated server (e.g., MICROSOFT DYNAMICS server) provides an additional layer of security between visualization clients and any data sources, such as a database server or servers for example. As described below, interactions with an adjustable data point of a time line representation can be contained as a transaction change that opens a corresponding task page for the record underlying an associated adjustment.

In one embodiment, the system 100 use a data format for visualization presentations that uses an extensible markup language (XML) definition. For example, a data builder feature (e.g., .NET) can be used by integration code to build the data in a strongly typed way. In such an embodiment, the visualization controls provide events for selection and activation of an item. The integration code can handle events and provide new data when necessary. For example, an extensible application markup language (XAML) control can be used by the integration code to control aspects of a data visualization.

An exemplary computing system includes suitable programming means for operating in accordance with a method of providing a visualization interface and controls for interacting with visualization data. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments.

FIGS. 2A-2I depict aspects of an exemplary client-server based visualization environment 200. Components of the environment 200 can be used to target a class of business data that represents a series of changes on a measure's value over time, such as: the amount of an item or item group in the inventory that is based on inventory transactions over time, and/or balance of an account over time as influenced by the account-related transactions. A data visualization can be used to identify periods of time during which the value falls under zero and addition horizontal target lines can be added to the visualization for further visual comparison with target levels.

A visualization can be used to visually mark special dates, such as today and work date as examples. One of the strongest values of the visualization is the comparison of multiple (what-if) scenarios, for example, by taking a certain forecast into account. As an example, a user can use an interactive time line representation and change an amount and date of a transaction directly by simply dragging the visual point of a transaction to the new amount or new date. As described below, a changed transaction can be tagged visually with a symbol representative of the change or changes. The projected consequences of a change can be shown immediately.

An interactive time line visualization provides a visual representation of data that is transformed into a mental model that allows users to grasp the influence of transactions over time on certain measures. The visualization can be used to provide insight into business transactions by showing projected aggregated consequences over time. The visualization provides interactive access to amounts and schedule of transactions in the graphical presentation. It also allows creating new transactions and deleting existing transaction. In one embodiment, a visualization can be used to depict projected consequences on an observed measure immediately as a user interactively modifies transactions in the visualization before the changes have been posted to the business logic.

The time line visualization of one embodiment includes core transactions, a forecast, and with changes information as suggested by a planning engine. These suggested changes can be implemented as action messages. Users can drag data points to change supply quantity or move them in time to suggest a rescheduling action. Changes can be transmitted back to application code for processing and validation, where the changes can be applied or rejected. Users can interact with the visualization by zooming, scrolling, creating and deleting supply, reverting supply changes, and automating adjustment for individual supply to balance the inventory until a next planned supply, as illustrative examples.

Figure 2A:
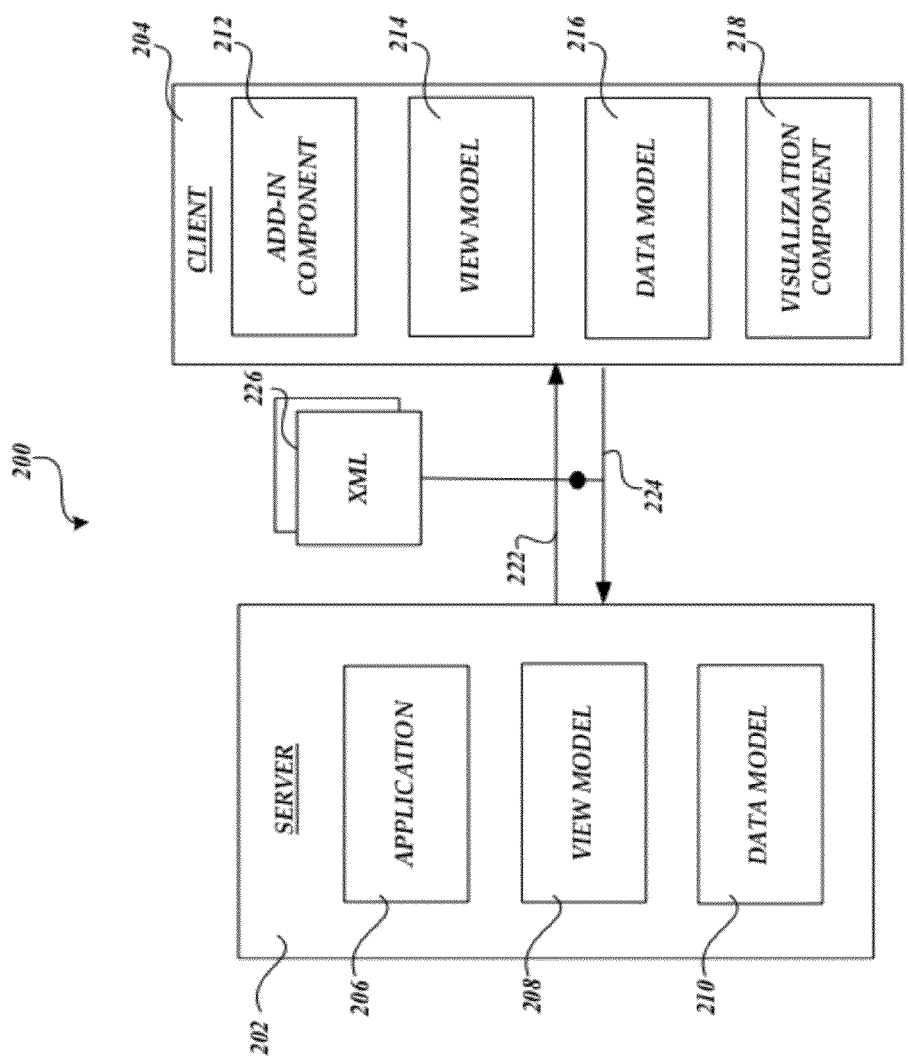

As shown in FIG. 2A, the environment 200 includes various components, including a server 202 and a client 204, used in part to provide an interactive visualization experience, but is not so limited. In an embodiment, the server 202 includes an application 206, such as a resource planning application for example, a view model 208, and a data model 210 used in part as a data building system or data builder. The client 204 of this embodiment includes add-in component 212, view model 214, data model 216, and visualization component 218. According to one embodiment, the client 204 includes an add-in library and the server 202 includes a data builder, communicating over a communication channel that includes ports 222 and 224 (e.g., XML port(s) and a .NET data set(s)), using XML data and schema information 226 (shown as XML). The use of one or more XML ports provides a mechanism to provide a communication channel using XML documents, enabling a server side declaration of an associated visualization model. Correspondingly, visualization driven data documents can be composed and consumed using ports 222 and 224.

As described above, components of the environment 200 can be used to provide a data visualization interface, including an interactive time line representation designed to be reusable in multiple application scenarios. For example, an interactive time line representation can be provided to an end-user using one or more resource planning applications to deliver a defined data, command, and event model. In one embodiment, a resource planning or other application and/or system can include integration code to host a visualization in an associated user interface (UI) that communicates transaction data, and receives and processes changes, including updated changes applied in an associated visualization. For example, server 202 can receive change transactions from client 204 after a user has affirmatively applied changes in an associated visualization (e.g., selecting an Apply and Save option).

In an embodiment, a visualization environment includes a set of application objects that implement data communication over XML ports, removing a need for server side extension objects to impart data handling. Integration objects contain logic to aggregate transaction events and populate a visualization data model. The integration objects also contain logic used to receive updated changes and apply the changes to respective business transactions. In one embodiment, the visualization add-in component 212 can be configured to receive documents in XML format using a schema contract (see exemplary schema below) defined in part by the add-in code to supporting command and data documents, but is not so limited. In one embodiment, a data document that contains information influencing the view and the table of events visualized along a time line representation, and/or a command document contains one or more of the commands that the visualization understands, and allows a host of the visualization to control all or individual interactive data points in the same way as the user can. A visualization add-in operates to communicate events to a host using a trigger (e.g., OnControlAddIn trigger). Each event can be characterized by a message ID that characterizes the type of event and contains further string data that provides context information used by the host to process the event, but is not so limited.

As described below, the environment 200 can be used in part to provide a visual model for a number of transactions over time in context of a resulting level. For example, components of the environment 200 can be used to provide a time line visualization that includes colored and/or filled step line portions used in part to indicate quantity or some other variable over time. In one embodiment, a low quantity representation can include a dotted or other distinguishable fill. The environment 200 can be used with any number of client devices and systems to provide a visual comparison of multiple scenarios, including taking into account select types of transactions, including visual indication of certain issues.

For example, a user can tailor a time line graphical presentation to identify potentially significant business events and/or parameters, such as identifying transactions (or lack thereof) having one or more below zero levels as part of ascertaining business parameter adjustments for a particular business scenario. As one example, components of the environment 200 can be used to provide interactive modification of transactions in different periods of time (e.g., rescheduling transactions/shipments) and/or amounts, including visualizing consequences of various levels without actually booking/executing business transactions. As described below, changes can be shown visually and aggregated as feedback to associated business logic.

Figure 2B:

FIG. 2B is a functional block diagram of a number of exemplary components of environment 200 as part of providing a visualization interface. As shown, an exemplary application programming interface (API) architecture 240 is shown that includes a number of interactive components. In one embodiment, the various exemplary interfaces 242-262 can be configured as public APIs of environment components for use in part to integrate the various visualization features into further application and personal/particular business setting/particular user setting (finance, health, inventory, yearly prognosis, etc.) scenarios.

As shown in the example, the API architecture 240 of one embodiment includes a generic or base interface 242 (ivaluecontroladdindefinition) for a control add-in definition that binds a control add-in with various data types (e.g., System.String or System.Object data types to a database). Interface 244 (iobjectcontroladdindefinition) is a base interface for a control add-in definition interface that binds the control add-in with a data type (e.g., System.Object) and raises a control event (e.g., Microsoft.Dynamics.Framework.UI.Extensibility.ControlAddInEventHandler event).

Interface 246 enables the control add-in to call the visualization framework (e.g., MICROSOFT DYNAMICS computing architecture) to get additional information about the control add-in behavior. Interface 248 (e.g., IControlAddInSite) allows a control add-in to get information about a container of the add-in control. Interface 250 (e.g., istringcontroladdindefinition) is a base interface for a control add-in definition interface with a string value type and a specific event (e.g., ControlAddInEventHandler). Interface 252 (e.g., ieventcontroladdindefinition) is a base interface for a control add-in definition interface that defines a specific event (e.g., ControlAddInEventHandler event). Delegate 254 (e.g., controladdineventhandler) specifies a control add-in event. Sealed class 256 (e.g., controladdinexportattribute) is used to declare a class to be a control add-in that can be used in the client 204. Sealed class 258 (e.g., validationresult) is used to represent a result returned by a validation method (e.g., ValidationRule.Validate method) that indicates whether a checked value passed an associated validation rule.

The API architecture 240 of the example shown in FIG. 2B also includes style and validation state parameters 260 and 262, respectively, each including an enumeration of values that represent certain visualization states (e.g., if validation state is T/F then action or action/if style state is X then perform action Y, etc.). As described briefly above, components of environment 200 can be used to provide a time line visualization interface that includes an adjustable time line presentation, including focus and time travel features. For example, a visualization interface can be provided in part using one or more of the public APIs to render and re-render an interactive graphical step line representation displayed using a client application. As shown in FIG. 2B, and in accordance with an embodiment of the environment 200, classes and interfaces are independent of a display target or client.

Figure 2C:
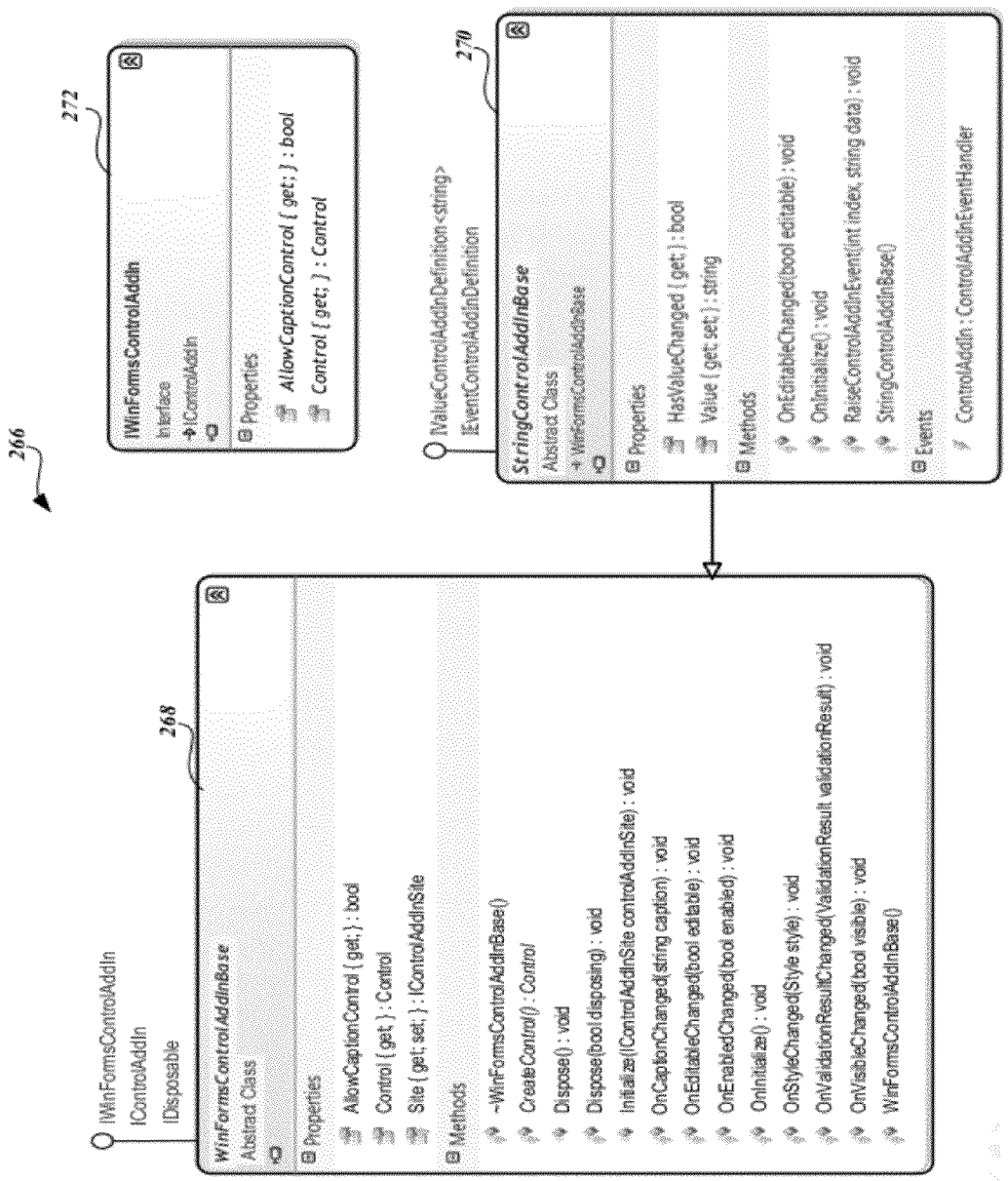

FIG. 2C is a functional block diagram of a number of exemplary components of environment 200 as part of providing the visualization interface. As shown, an exemplary API architecture 266 is shown that includes a number of interactive components. As shown in FIG. 2C, and in accordance with an embodiment of the environment 200, classes and interfaces are configured for a specific target, such as a RTC/WinForms display target for this example.

As shown, abstract class 268 (e.g., winformscontroladdinbase) is a base class for a WINDOWS forms control add-in as an alternative to the explicit implementation of the IWinFormsControlAddIn interface. Abstract class 270 (e.g., stringcontroladdinbase) is a base class for a WINDOWS forms control add-in that binds System.String type data with the database and uses events to call the OnControlAddin trigger on RoleTailored client page controls. Interface 272 (e.g., iwinformcontroladdin) can be used to develop control add-ins that target WINDOWS forms—based displays, including implementing the interface explicitly and overriding its members, or implementing WinFormsControlAddInBase or StringControlAddInBase abstract base classes that implements the interface automatically.

FIG. 2D depicts an exemplary interface 274. The interface 274 of an embodiment can be used as creating a communication channel supporting application language (AL) code with outbound data communications from server 202 using application logic to the visualization component 218 of the client 204 (e.g., providing XML port #####). As shown in FIG. 2D, the exemplary interface 274 includes a number of columns including node name column, node type column, source type column, and data source column. As described below, the Transaction 276, SpecialDate 278, and SpecialValue 280 elements are coupled to tables that contain data used in part to define a particular visualization state using a number of schema data structures.

The communication port ##### provides a number of convenience methods that assist with setting the data and generating an XML document to be communicated/consumed by the client 204 and consumed by the visualization component 218. A number of exemplary methods are shown in Table 1 below.

TABLE 1

| Method Name | Description |
| --- | --- |
| Reset | Clears the XML port from all Transactions events and other data. |
| SetChartTitle | Sets the Title and Items name that are shown as a caption in an associated visualization. |

TABLE 1-continued

| Method Name | Description |
|---|---|
| SetLegendSeriesTitle | Set the title of the Legend for one of the three side by side scenarios. |
| SetExportData | Sets the table of transaction events of type Table 'Timeline Event' |
| AddSpecialValue | Adds a special value which is shown as a horizontal line, with a value, a title with a certain line color. |
| ClearSpecialValues | Removes all special values from an associated visualization. |
| AddSpecialDate | Adds a special date which is shown as a vertical bar, on a certain day and a title. |
| AddWorkdate | Adds WORKDATE as a special date with title 'Workdate' |
| ClearSpecialDates | Removes all special dates. |
| SetUniqueness | Used to set a uniqueness value that assures that the visualization is accepting the data document, even if the content has not changed; set to an increasing value for example. |
| SetMinAutoAdjustLevel | Sets a minimum level for a supply when selecting "Auto Adjust Supply" in the associated visualization, such that the level does not fall under such a level until a next supply event. |
| ClearMinAutoAdjustLevel | Resets the minimum level for "Auto Adjust Supply" to 0. |

FIG. 2E depicts an exemplary interface 282. The interface 282 of an embodiment can be used as completing the communication channel supporting the AL code with inbound data communication of changes from the client visualization to the server 202 and associated application logic (e.g., providing add-in XML port ####1). As shown in FIG. 2E, the exemplary interface 282 includes a number of columns including node name column, node type column, source type column, and data source column. As described below, the TransactionChanges 284 element is coupled to a table that contains data used in part to define a particular visualization state using a number of schema data structures.

The communication port ####1 provides a number of mechanisms for implementing and/or communicating field changes using one or some combination of flags. Table 2 lists a number of exemplary flags used for field changes.

TABLE 2

| Flag | Value | Description |
|---|---|---|
| New | 0x1 | A new data row, representing new supply or other variable |
| Deleted | 0x2 | A deleted data row, representing deleted supply or other variable |
| SupplyChanged | 0x4 | A data row with changed supply or other variable |
| Rescheduled | 0x8 | A data row with rescheduled supply or other variable |
| Reverted | 0x10 | A data row with one or more changes reverted, where the one or more changes has been suggested by an associated system or application (e.g., a resource planning application) |

Tables 3A-3D show a number of exemplary data tables used by the environment 200 in part to manage visualization data.

TABLE 3A

Transaction

RefNo
Change RefNo
Transaction Type
Description
Original Date
New Date
Original Quantity
New Quantity TABLE 3A-continued Transaction Level
Editable

TABLE 3B

Transaction Changes

RefNo
Change RefNo
Changes
Original Date
New Date
Original Quantity
New Quantity

TABLE 3C

Special Date

Date
Caption

TABLE 3D

SpecialValue

Value
Caption
Color

FIGS. 2F-2I depict exemplary schema data structures that can be used with data of the data tables as part of providing a visualization environment that includes a time line representation. In an embodiment, the data, together with a number of properties that define a view of the data, can be exposed by the schema of FIG. 2F. As shown, the schema can be used to define input data for a time line visualization, including using a table for various visualization types including a transaction type, a special date type, and/or a special value type. A sample for a special date would the 'Workdate' in an accounting scenario, simply 'Today' or any other date that will be marked in the visualization with a name. A sample for special value would be "Reorder point", "Minimum stock level", "Maximum stock level", where each special value of an embodiment can be drawn as a colored horizontal line including a label (see FIG. 3I).

As shown in FIG. 2F, an exemplary transaction element provides a list of transactions that include the level of a visualized measure, together with changes in amount and/or schedule. That is, a transaction can be described as an event that influences the amount of a measure over time. An exemplary transaction occurs at a certain date and/or time and influences an associated amount by a certain quantity. An exemplary special date element provides a list of special dates shown as vertical background area for a day with a vertical title caption. An exemplary special value element provides a list of special values as horizontal colored background lines with a horizontal title caption.

Figure 2G:
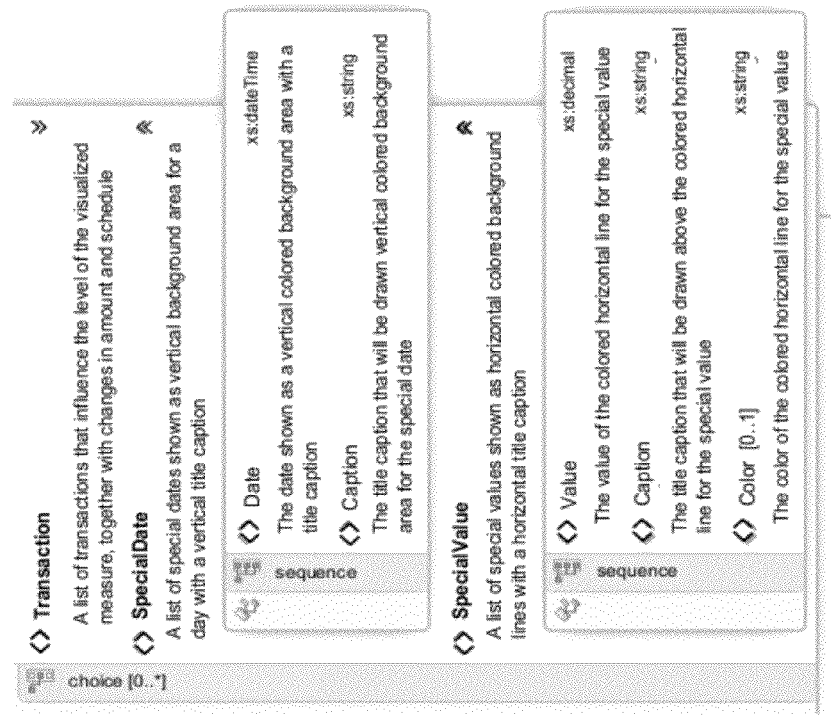

FIG. 2G depicts a further breakdown of an exemplary schema for the transaction element.

Figure 2H:
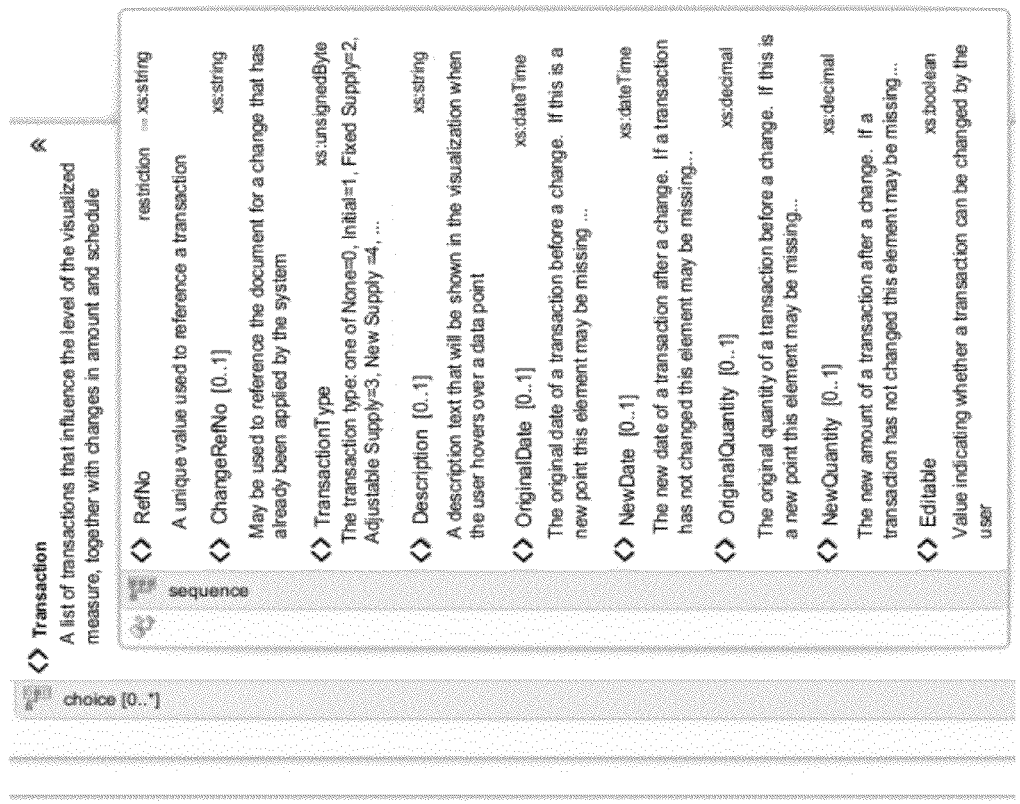

FIG. 2H depicts a further breakdown of the exemplary schema for the special date and special value elements.

In one embodiment, components of environment 200 uses a command document to effectuate control of an underlying visualization. The command document can be illustrated using a string in the following exemplary format:

'Command:'+[Command]+','+[RefNo]+','+[Parameter]

This format assumes that neither [Command], nor [RefNo], nor [Parameter] may contain a ',' character. In one embodiment, RefNo is a unique application defined value used to reference a document that represents a transaction.

Table 4 includes a number of exemplary supported values for [Command].

TABLE 4

| Command | Description | Parameter |
| --- | --- | --- |
| "clear" | Command that tells the visualization to clear all data. | No parameter used. |
| "delete" | Command that tells the visualization to delete a data point | RefNo of the data point. |
| "reschedule" | Command that tells the visualization to reschedule a data point | Parameter: RefNo of the data point. Parameter: New date. |
| "revertchanges" | Command that tells the visualization to revert to Original Quantity and Original Date. | Parameter: RefNo of the data point. |
| "changequantity" | Command that tells the visualization to change a data point's amount. | Parameter: RefNo of the data point. Parameter: New amount. |
| "setcurrent" | Command that tells the visualization to set the Current data point. | Parameter: RefNo of the data point. |

A visualization add-in component can use one or more events as part of rendering a time line visualization. For example, a trigger (e.g., OnControlAddIn trigger) of a hosting field on a page can be called with one or more event types. Table 5 lists a number of exemplary events used as part of a call as part of providing a visualization.

TABLE 5

| 'Index': Event ID | Description | 'Data': Parameter |
| --- | --- | --- |
| 100 | Changed data: e.g., User may have rescheduled and/or changed quantity. | XML Document of all changes |
| 101 | Selected point has changed: User has selected a different interactive data point | RefID of the changed data point |
| 102 | Data point has activated: Typically when a user has double clicked a data point | RefID of the changed data point |
| 999 | A command has been processed. | NONE |

The changed data event (100) can be sent for each user interaction that changes some aspect of a time line representation. For example, event '100' can be used to track a user drag operation with an interactive data point, and/or through actions in the point/free area context menu. In one embodiment, an event '100' can be fired when a user changes a data point interactively (e.g., dragging or through context menu) and/or a first time an interactive series is provided and/or displayed. In one embodiment, the Data parameter of the event contains only the changes and the references to the changed or adjusted data points, and does not contain the data points that have not been changed from either original amount or original date and are not a new supply. The data contains all of the changes, regardless whether the changes resulted from an end user or have already been sent as transactions for an associated visualization. In one embodiment, the application of server 202 can e.g. use the value in ChangeRefNo in the input transaction data to indicate a reference to an "Action Message" or other change activity, in order to track changes imparted by the user on top of a change message by the application.

Figure 2I:
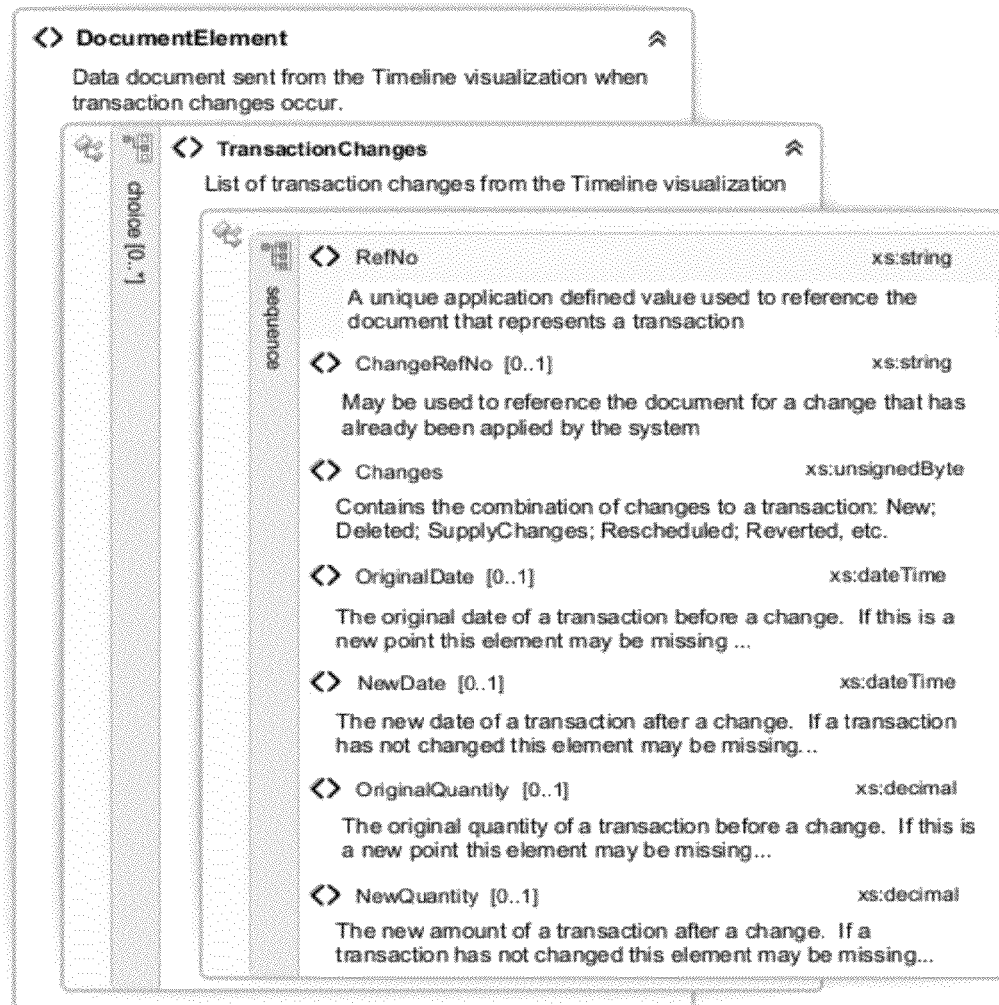

FIG. 2I depicts an exemplary schema for the transaction changes element for a time line visualization. For example, the schema can be used to process changes sent from client 204 to server 202 as part of providing a visualization interface that includes an interactive time line representation. For example, the event '100' signifies that data has changed, such that the Data parameter follows the data schema of FIG. 2I. As shown, the changes element contains a combination of changes to a transaction. In one embodiment, the changes element contains one or more of a new type, deleted type, supply changes type, rescheduled type, and/or reverted type.

Figure 3A:
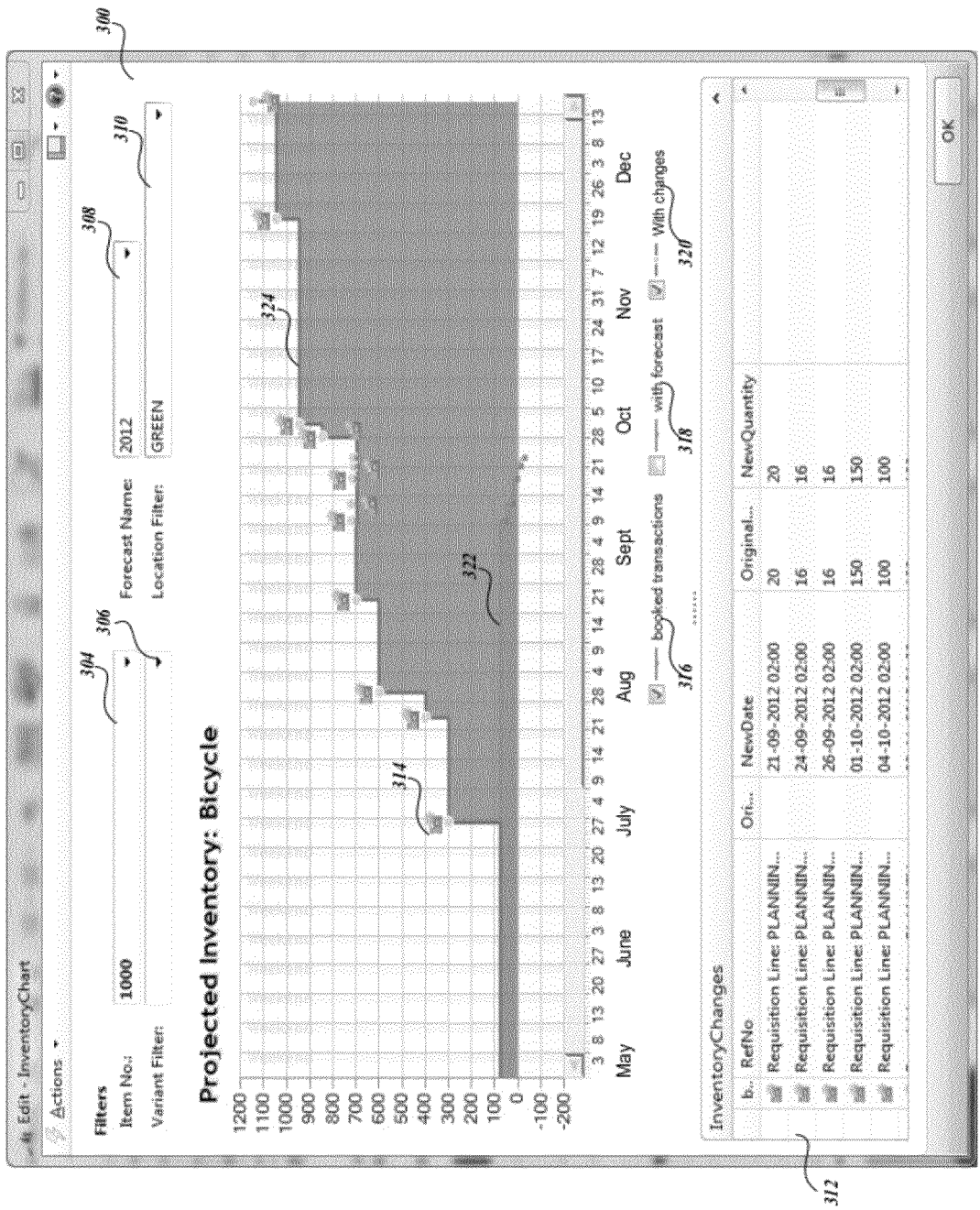
FIGS. 3A-3I depict aspects of an exemplary visualization interface.

FIGS. 3A-3H depict aspects of an exemplary visualization interface 300, including an interactive time line representation. As shown in FIG. 3A, the visualization interface 300 of an embodiment includes a step line graphical representation 302, filters 304-310, and a data value list area 312. For this example, the user is using the visualization interface 300 to example projected bicycle inventory over a given frame of time. As shown in FIG. 3A, the user has used filter 304 to select item number "1000" to interactively view various data visualizations for the bicycle inventory. In one embodiment, the visualization interface 300 can be included as part of a client server operational architecture, wherein a client component uses the visualization interface 300 to display data visualizations based in part on one or more complex data sets provided and/or managed by a serving computer.

In an embodiment, the step line graphical representation 302 of the visualization interface 300 can be used in part to visualize comparisons with target levels, including interacting with aspects of the step line graphical representation to identify consequences of changes/inputs. For example, a user can move adjustable data points forward in time, backward in time, to a higher value or values, and/or to a lower value or values. In one embodiment, adjustable data points of the step line graphical representation 302 can be depicted in a certain color (e.g., green for adjustable, red for unadjustable), wherein one or more visual change indicators or symbols (e.g., visual change indicator 314), including distinct colors and/or shapes, can be rendered in the step line graphical representation 302 to represent that a data point has been changed or modified, whether by the visualization system or user.

If the user hovers over an adjustable data point (e.g., a green circle/dot symbol), information associated with the data value is presented to the user. For example, a hover operation over an adjustable data point can operate to provide a pop up a pane of information regarding how much an associated data point has been moved forward, backward, increased and/or decreased. As described below, a user can adjust adjustable data points and obtain information about the changes (e.g., hover operation), while also undoing certain changes (e.g., right click to open drop down with undo option). As shown, exemplary visual change indicator 314 informs the user that a new supply has been added on this date. Moving forward in time from this point highlights additional supply added, as shown by the visual change indicators.

With continuing reference to FIG. 3A, in addition to filtering options 304-310, the user has a number of available step line viewing or data population options 316-320 within the step line graphical representation 302 that can be selected/deselected to populate/depopulate the visualization interface 300 with associated data. In one embodiment, the options include a "booked transactions" option 316, a "with forecast" option 318, and a "with changes" option 320. Booked transactions data of an embodiment reflects actual realized transactions, whereas forecast data may or may not represent a realized scenario.

The changes data of one embodiment reflects changes to the step line graphical representation 302 resulting from interactive user inputs to adjustable step line portions or an associated resource planning system or application (e.g., new inventory added for an item). For this example, the changes data is plotted to reflect suggestions to improve future sales based in part on the booked transaction data. For example, the increased supply shown in FIG. 3A may be a result of an addition of extra inventory in an effort to increase the number of booked transactions. For example, a resource planning engine can be programmed with business logic in attempts to maximize profit over some time period for some product or service. A user can use the suggested changes provided by the planning engine to determine whether to change a purchase time to obtain a better price to potentially allow affording more bicycles for current and future stock.

For this example, a user has selected the "booked transactions" option 316 and "with changes" option 320, shown by first step line representation 322 and second step line representation 324, respectively. In one embodiment, upon selecting the "with changes" option 320, the step line graphical representation 302 can be populated with the second step line representation 324, wherein the step line and step portions are colored with a first type of distinguishing color (e.g., green). According to the example of FIG. 3A, the step line graphical representation 302 tracks projected bicycle inventory over a partial year span. For this example, selecting the "with changes" option 320 provides an overview of changing bicycle supply parameters over the given time span.

As described above, in one embodiment, each step line representation can include a colored line and/or corresponding fill color for the various step portions to readily distinguish the different tracking measures based in part on user selection of one or more of step line data population options 316-320. A user can use the visualization interface 300 to quickly determine success or failure and of a current plan or strategy, making adjustments according to realistic and/or sensible goals. A user can use the dynamic interactive nature of the step line graphical representation 302 to adjust adjustable data points (e.g., green icons), while receiving step line feedback (e.g., automatic leveling adjustments), in attempting to perfect or maximize results of some plan or action.

As the user interacts with aspects of the step line graphical representation 302 and/or planning engine provides updates or modifications, data within the data value list area 312 is automatically adjusted to represent any changes along with re-rendering of points and/or portions of the second step line representation 324. Due in part to the graphical visualization features, an end user immediately notices the ramp up in inventory over the period of time. The user can hover over one or more of the symbolic icons (e.g., visual indicator 314) to obtain further information about a data point or portion. For example, a user can hover over visual indicator 314 to bring up a pop-up pane that includes information pertaining to the inventory item of June 26. For adjustable data points, a control pane can also be provided to indicate permitted user action with a particular adjustable point (see FIG. 3H for example).

Figure 3B:
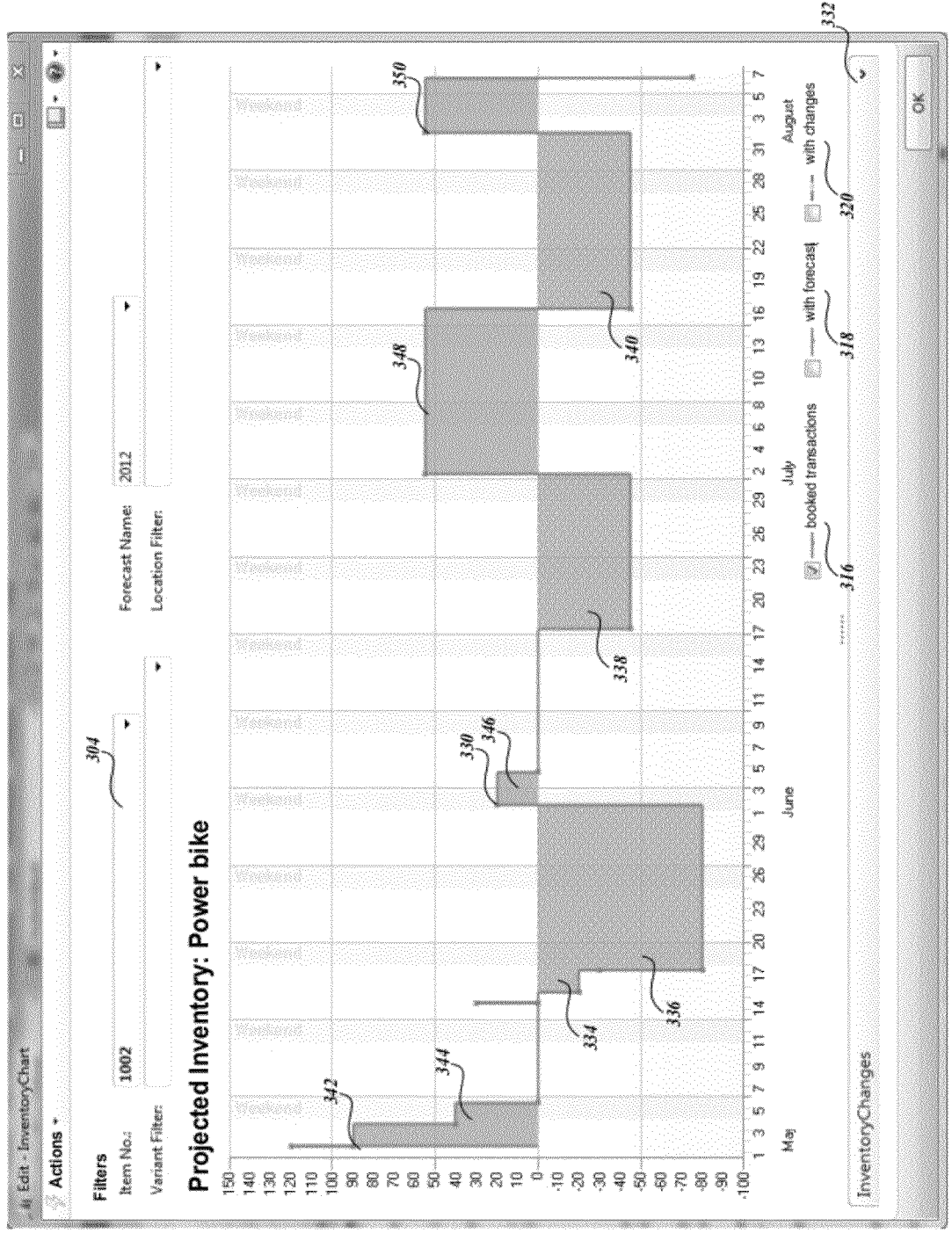

FIG. 3B depicts the visualization interface 300 after the user has used filter 304 to visualize projected inventory for a power bike being offered for sale, depicted as step line representation 330. It will be appreciated that different types of data and/or categories of goods and/or services can be presented in the visualization interface 300, depending in part on the underlying data sources and/or relevant schema used with the visualization data. For this example, the user has selected the "booked transactions" option 316 to obtain a current overview of success of the product, also viewed as demand for the item.

Based in part on such a visualization overview, the user can mold strategies based on marketing and/or product focus changes to optimize the bottom line. Due in part to the graphical visualization features of the step line graphical representation 302 and step line representation 330, an end user immediately notices important periods of time for the inventory item. For this example, the user important can observe both positive and negative milestones affecting the power bike's value to the business as depicted in the step line representation 330. The user has chosen to hide data value list area 312, represented in part by the expansion arrow 332. The negative step portions 334-340 represent potentially significant periods in time that may require additional attention and analysis by the user to ascertain the underlying cause or causes driving the negative nature of the step portions. Likewise, positive step portions 342-350 represent potentially significant periods in time that may require additional attention and analysis by the user to ascertain the underlying cause or causes driving the positive nature of the step portions.

Figure 3C:
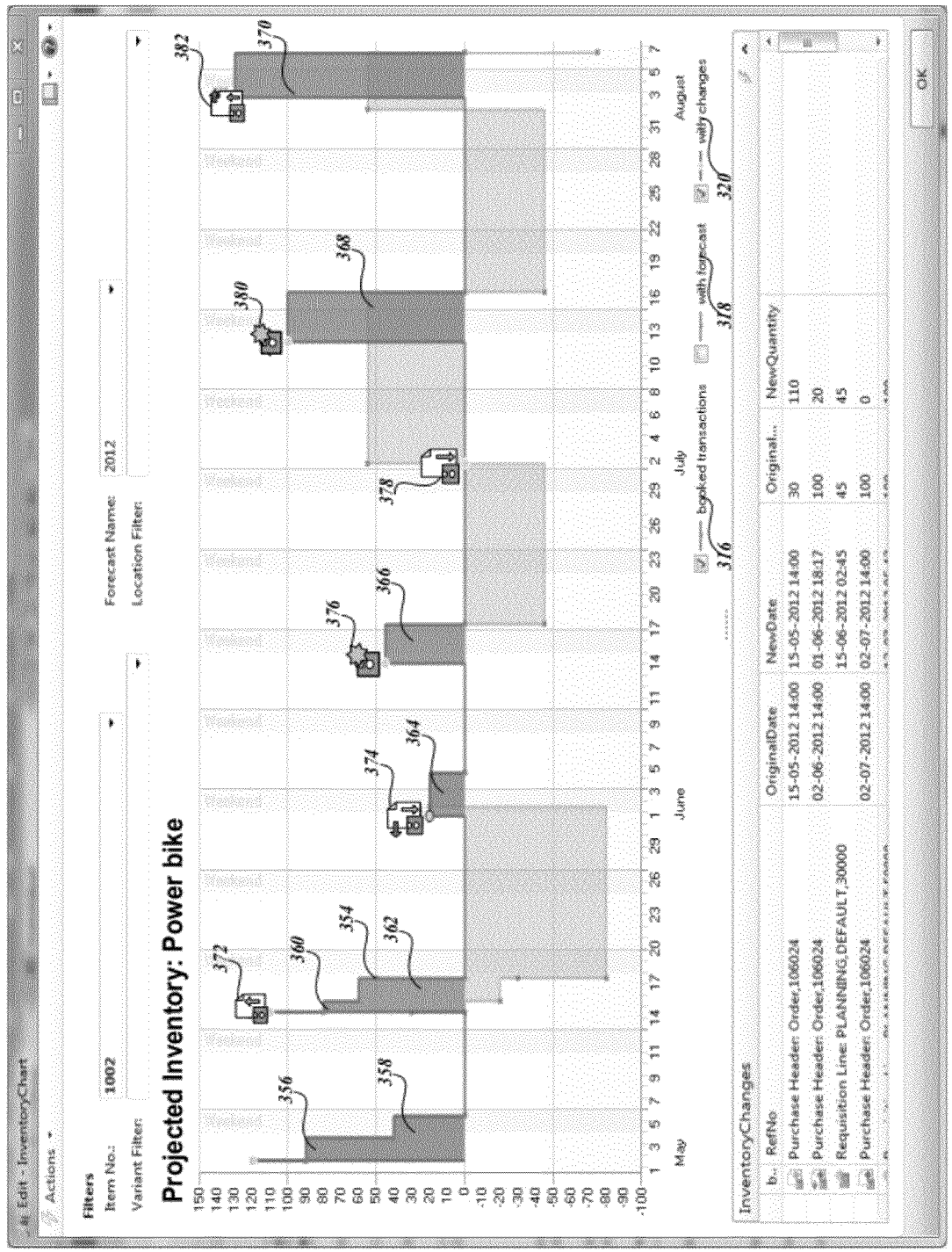

As shown in FIG. 3C, the user has also selected the "with changes" option 320 to display step line representation 354 as part of gaining further insight into the nature of the data and effects thereon. As shown, for this example, positive step portions 356-370 represent positive number of power bikes in the supply for the given time period. FIG. 3C also depicts a number of visual change indicators 372-382 that provide immediate visual change information as to changes made to or associated with the associated adjustable data points.

Visual change indicator 372 includes an upward pointing arrow to indicate that the coupled data point has been adjusted upward to a higher value. Visual change indicator 374 includes a left pointing arrow and a downward pointing arrow to indicate that the coupled data point has been adjusted backward in time and to a lower value. Visual change indicators 376 and 380 include an asterisk symbol to indicate that new supply has been added, either by the end user or planning system, for the coupled data points respectively. Visual change indicator 378 includes a downward pointing arrow to indicate that the coupled data point has been adjusted to a lower value. Visual change indicator 382 includes a right pointing arrow and an upward pointing arrow to indicate that the coupled data point has been adjusted forward in time and to a higher value. As discussed above, a user can hover over any of the indicators to obtain details regarding particular changes and/or make further adjustments to an adjustable data point or points.

Figure 3E:
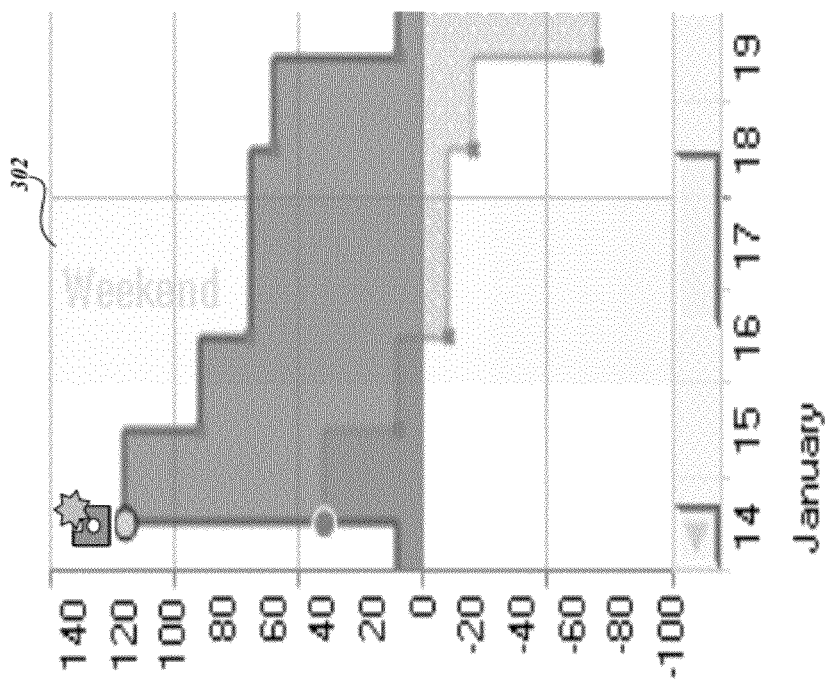
Figure 3D:
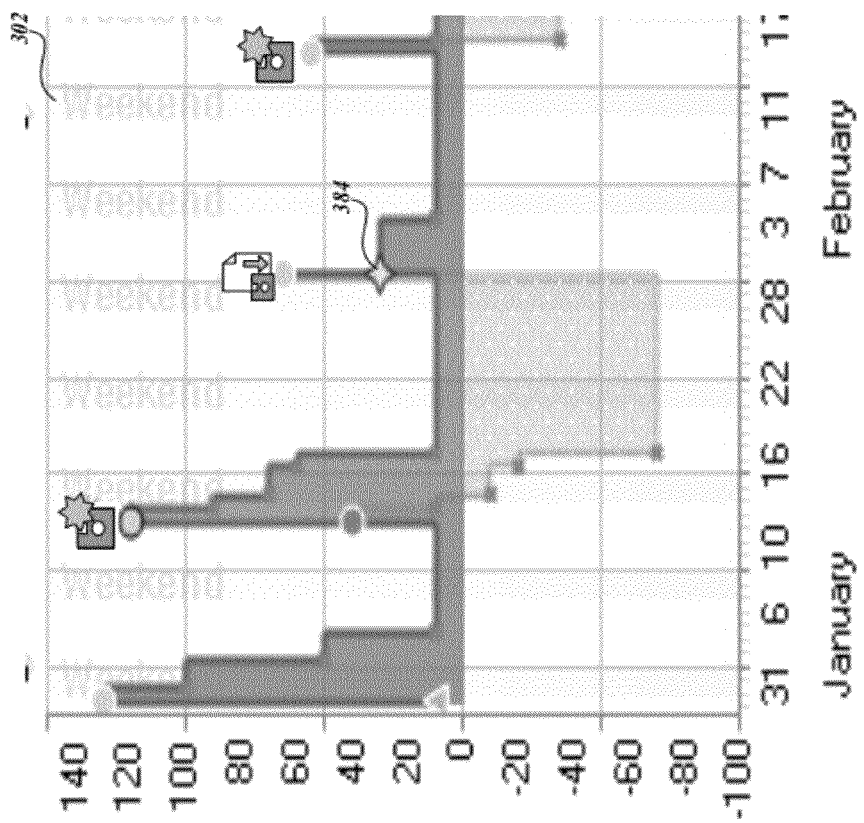

FIG. 3D depicts the step line graphical representation 302 after the user has used an input device (e.g., mouse, touch screen, etc.) to scroll to a different point in time, while zooming in on particular period of time and/or a particular span of data values. Some of the visual change indicators are also shown in more detail. A new type of visual change indicator 384 is shown which, for this example, is rendered as an outlined diamond. In one embodiment, the visual change indicator 384 represents a forecast value for a point in time and is filled with a certain color (e.g., yellow). The highlighted value is immediately recognized as a forecast value based on the shape and/or color, providing useful information to the user for further use and/or adjustment of business parameters. A forecast of one embodiment can be considered as a type of a virtual demand that demands portions that have not yet booked.

FIG. 3E depicts the step line graphical representation 302 after the user has used an input device to zoom in further on the scene.

Figure 3F:
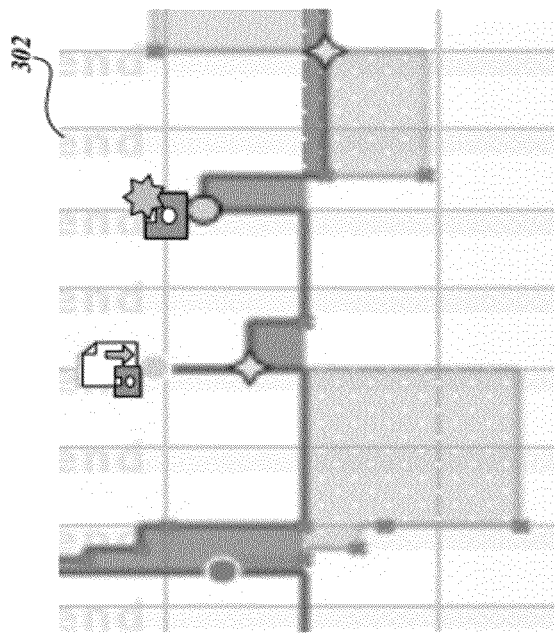

FIG. 3F depicts the step line graphical representation 302 after the user has used an input device to zoom and pan to another portion of the step line graphical representation 302.

Figure 3G:
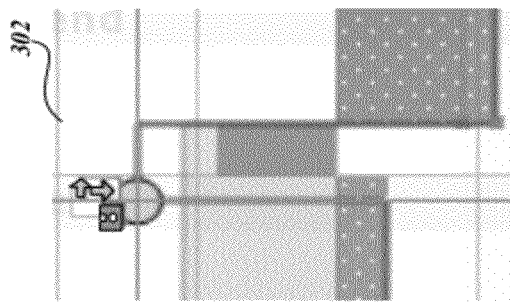

FIG. 3G depicts the step line graphical representation 302 after the user has used an input device to zoom further into the step line graphical representation 302.

Figure 3H:
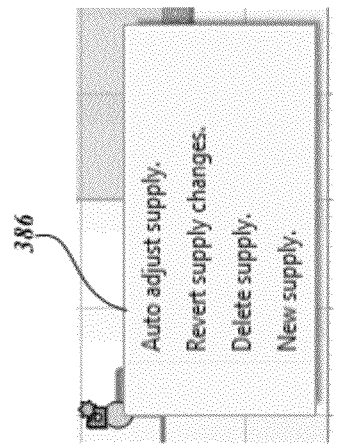

FIG. 3H depicts an exemplary pop up interface 386 that includes interaction options for interacting with an adjustable data point of the step line graphical representation 302. For example, a user can right-click to access macro functions for interactive charting, including create, read, update, and delete (CRUD) operations. An automatic adjustment function of one embodiment operates to automatically change a supply to balance inventory until the next supply.

Figure 3I:
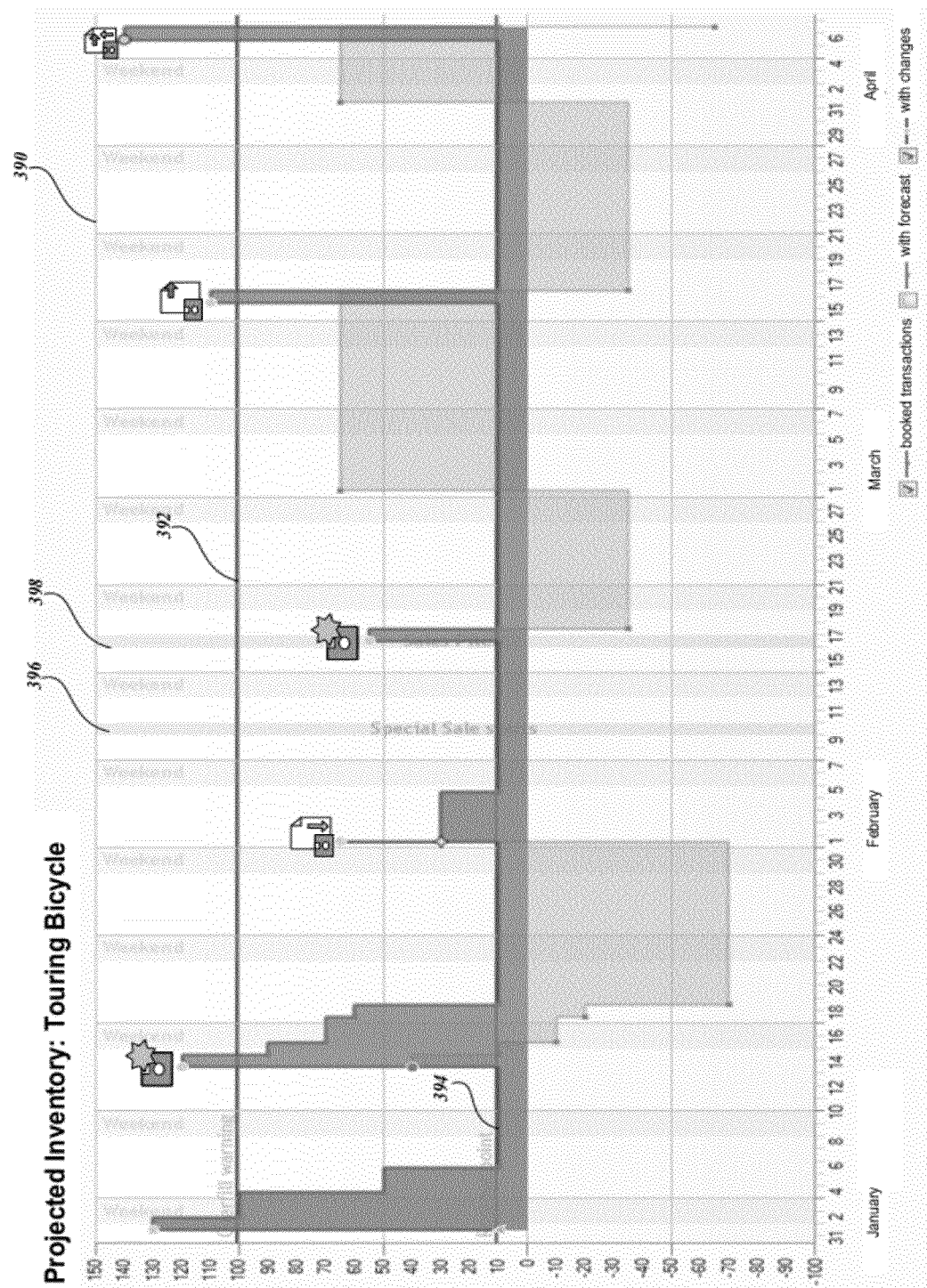

FIG. 3I depicts a step line graphical representation 390 for a touring bicycle depicting special values 392 (overfill warning) and 394 (reorder level) and special dates 396 (special sale starts) and 398 (special sale ends).

Figure 4A:
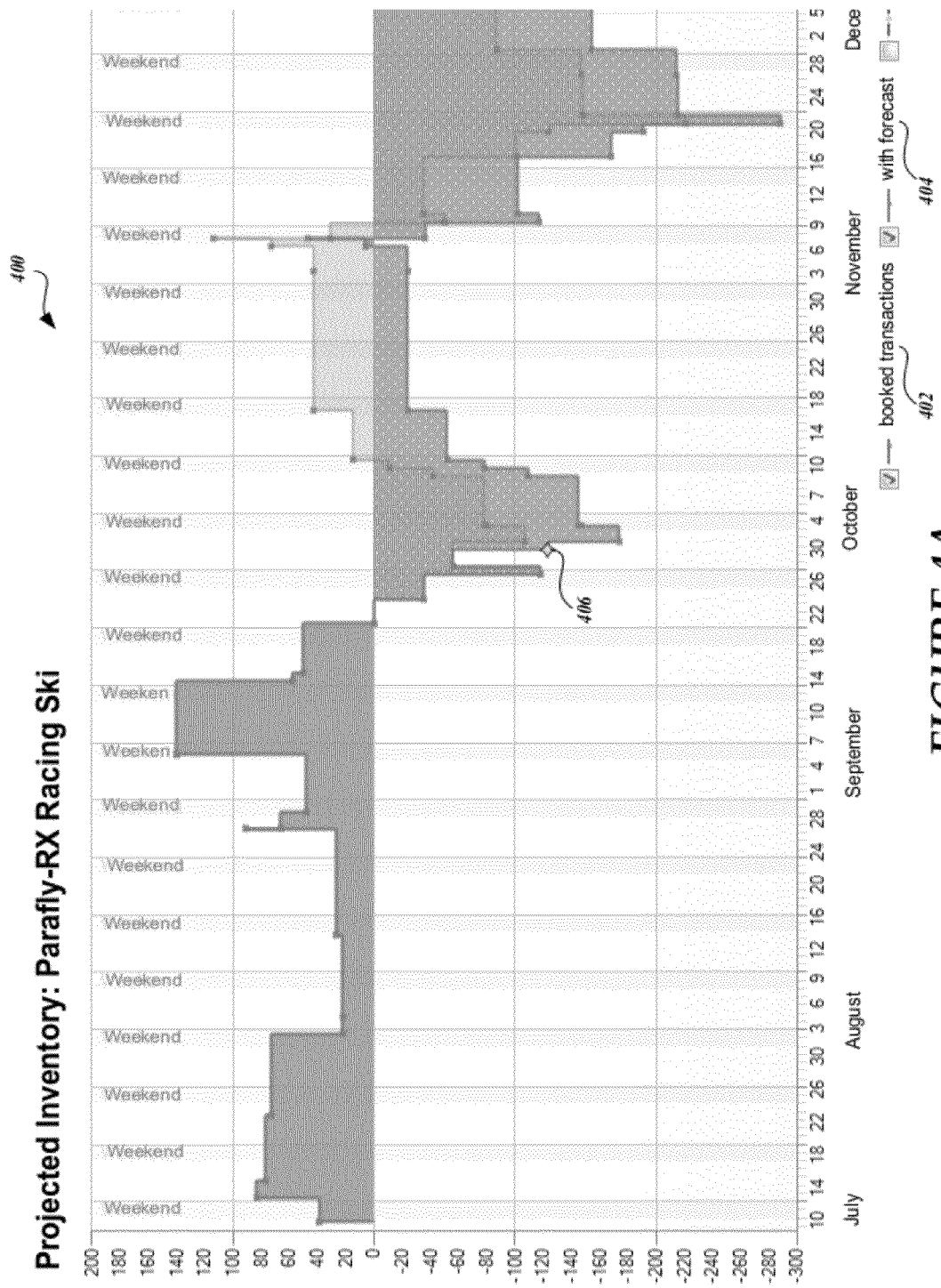
FIGS. 4A-4C depict aspects of an exemplary visualization interface.
Figure 4B:
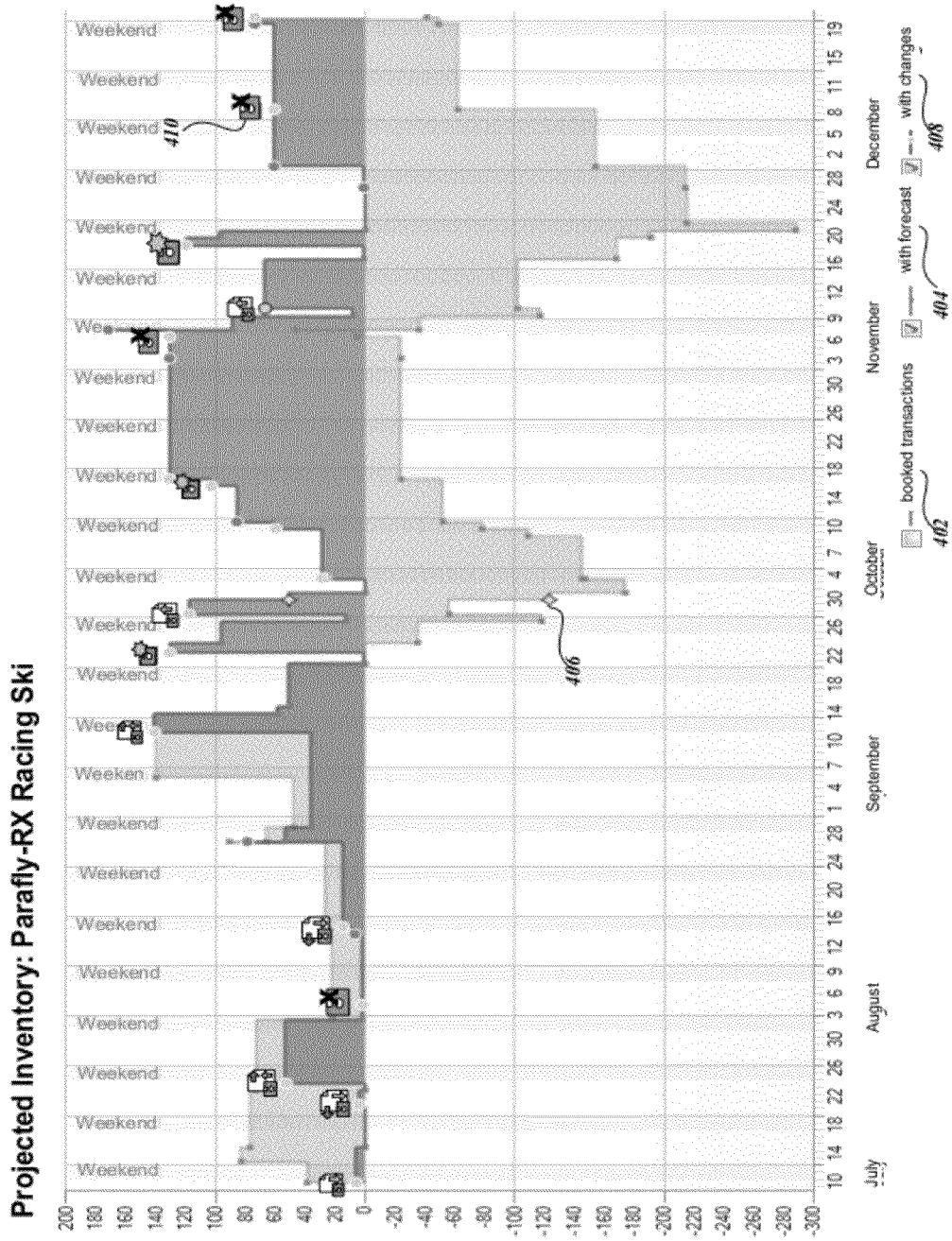
Figure 4C:
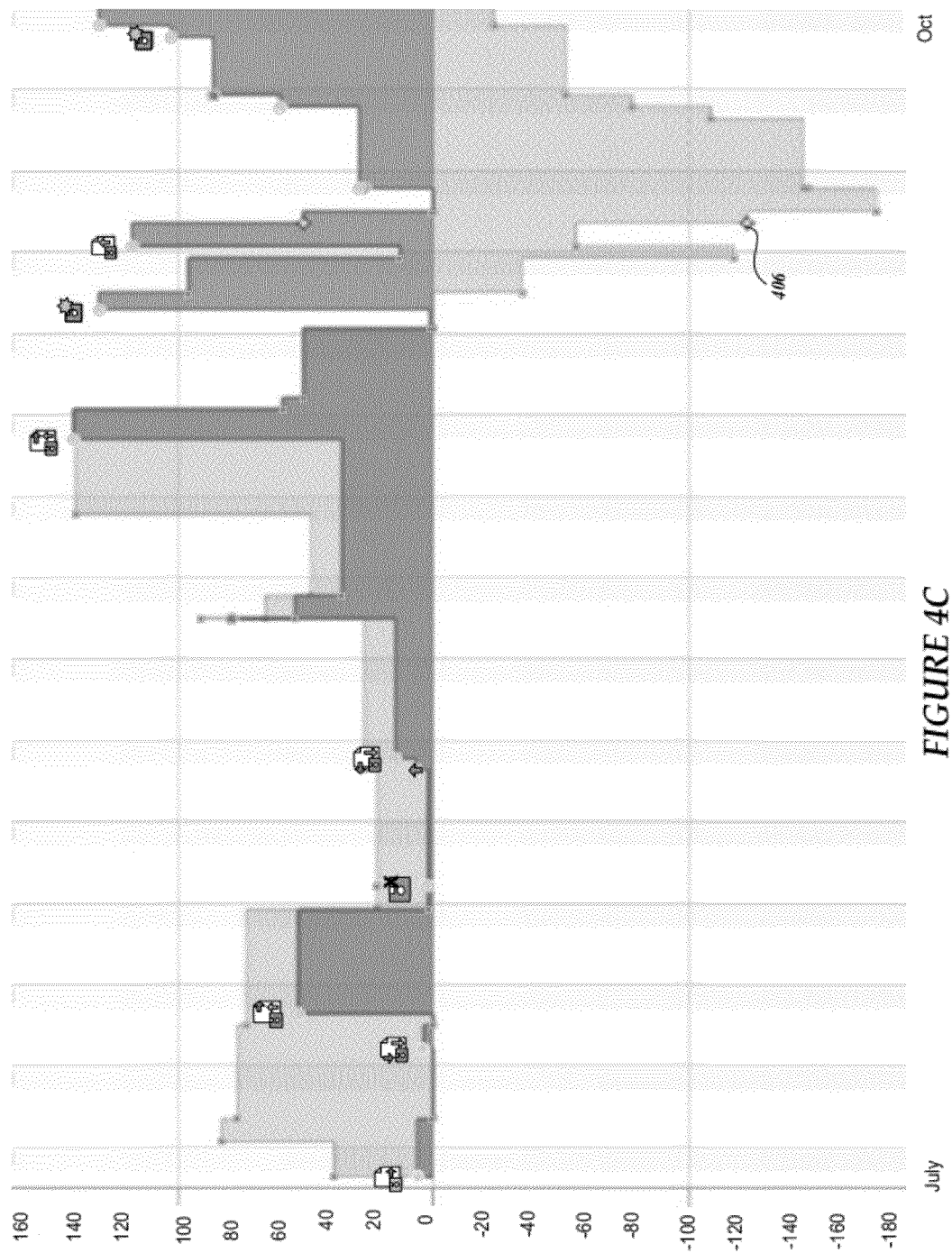

FIGS. 4A-4C depict aspects of an exemplary visualization interface 400 including an interactive time line representation tracking projected inventory for a type of racing ski. As shown in FIG. 4A, the user has selected the "booked transactions" 402 and "with forecast" 404 plotting options. As shown, a visual indicator 406 provides a user with a visual forecast indication. For example, the diamond shaped visual indicator 406 can be used to alert a user to a situation based in part on an assumption that some event will occur on the associated date.

FIG. 4B depicts the exemplary visualization interface 400 including interactive time line representations after the user has selected the with forecast" 404 and "with changes" 408 plotting options. As shown, exemplary visualization interface 400 is displaying another type of a visual indicator 410 that provides a user with deleted supply indication. The user can peruse the visualization data from left to right or vice versa to attain an understanding of changes made to adjustable data points as provided by the various visual change indicators.

FIG. 4C depicts the exemplary visualization interface 400 after the user has used an input device to zoom in on a different period of time as part of analyzing data using features of the visualization. Certain visual change indicators are shown in more detail. As described above, negative step portions of a time line representation can provide a key indication of a particular situation. For example, a negative step may represent some factual scenario that dramatically affects the bottom line of a particular product and/or service.

Figure 5:
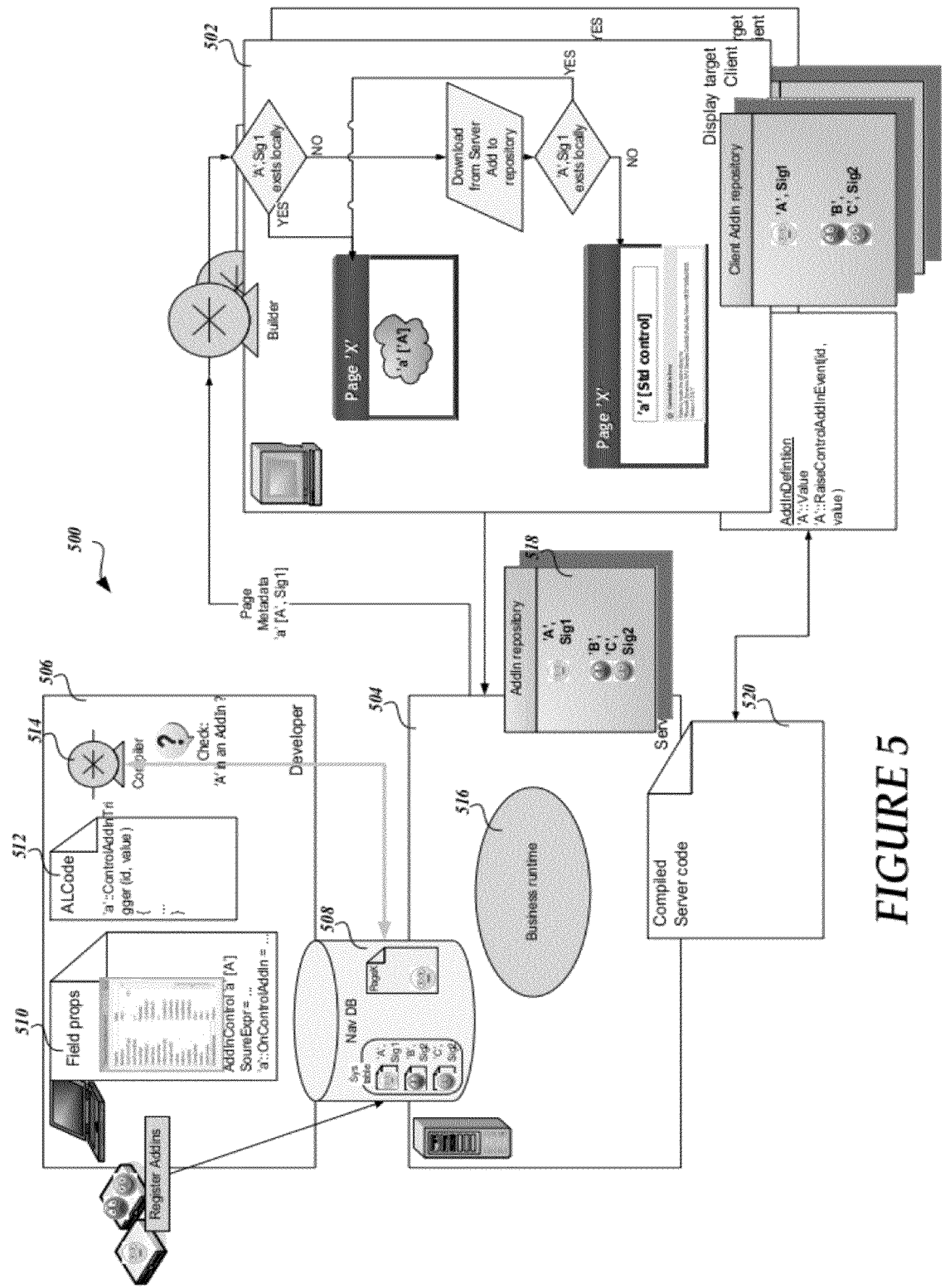
FIG. 5 depicts a functional block diagram of exemplary computing environment.

FIG. 5 depicts a functional block diagram of exemplary computing environment 500 including client, server, and developer components used in part to provide data visualization features. The client 502, server 504, and developer component 506 are used to provide interactive time line visualizations. As shown for the exemplary environment 500, the developer component 506 provides register add-ins to the database 508.

The developer component 506 of one embodiment defines field properties 510, application language code or logic 512, and compiler 514 used in part to compile add-in compatibility with server 504. As shown, database 508 includes sys table and at least one page (PageX). The server 504 of one embodiment includes a business runtime 516, an AddIn repository 518, and compiled code 520, but is not so limited. The client 502 of one embodiment includes client AddIn repository 522 and AddInDefinition component 524, but is not so limited. As shown, Page 'X' data structure is populated using local content if it exists, otherwise the client displays an error to download the add-in code.

Figure 6:
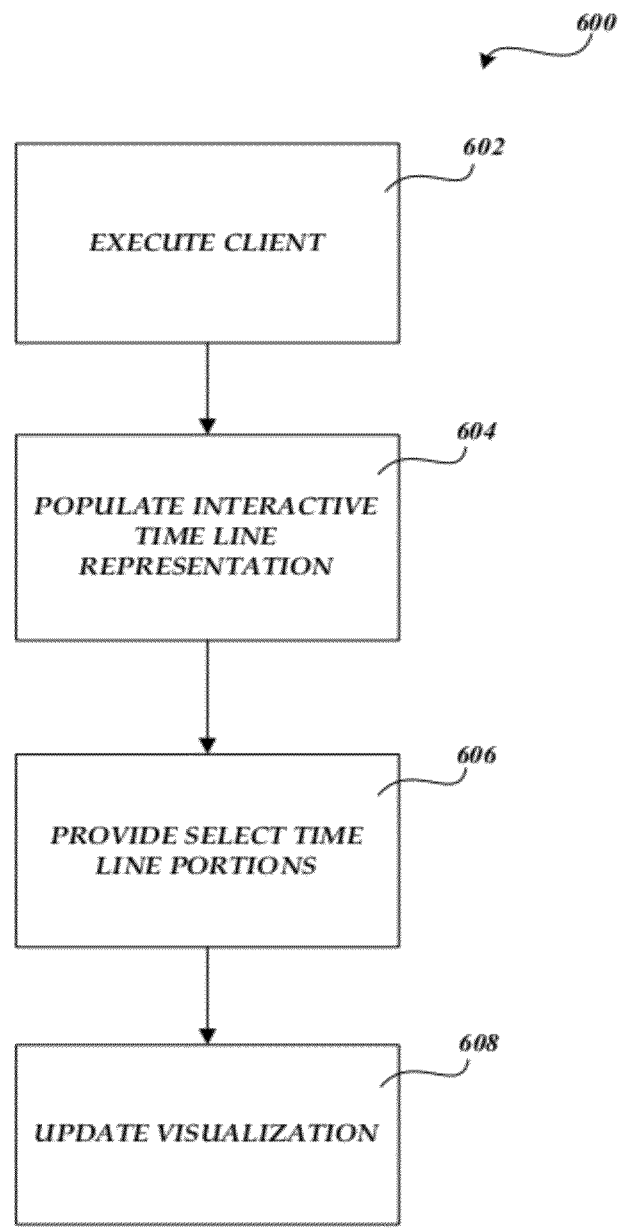
FIG. 6 is a flow diagram depicting an exemplary process of visualizing data.

FIG. 6 is a flow diagram illustrating an exemplary process 600 of providing a time line data visualization including visual controls and attention garnering/attracting features, but is not so limited. At 602, the process 600 begins when a client application is executed, providing a visualization interface that includes an interactive time line representation that can include one or more step portions, rendered with color and/or fill features to further distinguish. For example, the client can integrate with a server-based visualization application to provide visualization features for use in ascertaining forecasts and/or other issues associated with complex data sets. At 604, the process 600 operates to identify one or more data sources containing data to be used to populate visualization data structures. For example, a client user can select one or more types of data (e.g., booked data, change data, forecast data, etc.) to visualize using the interactive time line representation.

At 606, the process 600 provides select time line portions based in part on the one or more selected data types. For example, as part of using a visualization interface, the user may check interface boxes to display booked transaction data and forecast data to ascertain trends and/or highlight data transactions using the visualization interface. At 608, the process 600 operates to update the graphical visualization based in part on changes made to one or more adjustable data points of the interactive time line representation. For example, a user may adjust multiple adjustable data points of one or more time line portions, wherein changes made can be symbolized with symbolic representations to highlight types of changes made.

The process 600 of one embodiment uses color and fill effects, along with a number of visual change indicators, as part of dynamically updating displayed step line portions as a user interacts with data points within a visualization to identify various issues (e.g., profit, loss, gain, orders, sales, need to change items/processes, etc.). While a certain number and order of operations is described for the exemplary flow of FIG. 6, it will be appreciated that other numbers and/or orders can be used according to desired implementations and other embodiments are available.

Figure 7:
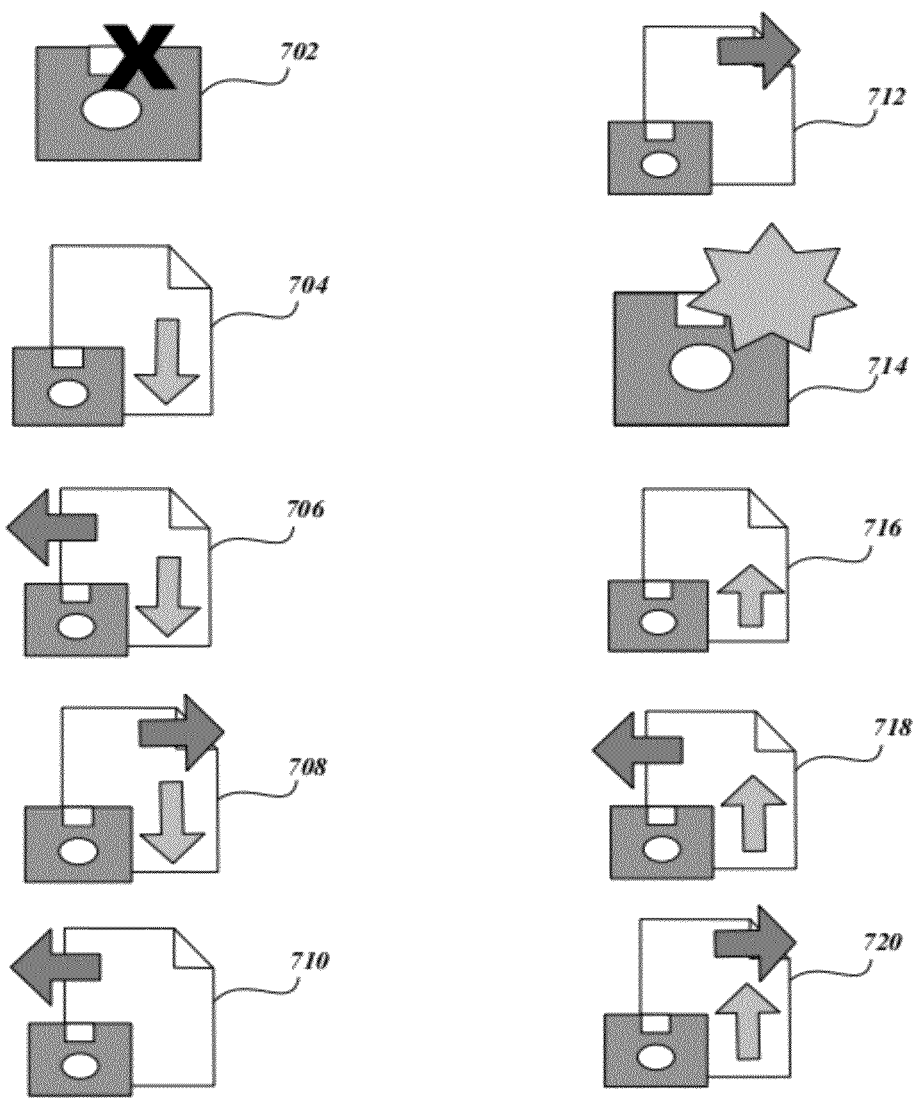
FIG. 7 a number of exemplary visualization symbols or indicators.

FIG. 7 depicts a number of exemplary visual symbols or indicators 702-720. As shown, visual change indicator 702 is used to indicate that a transaction has been canceled/deleted such that it does not influence the amount. Visual change indicator 704 is used to indicate that a transaction has been decreased in quantity. Visual change indicator 706 is used to indicate that a transaction has been decreased in quantity and also scheduled earlier in date/time. Visual change indicator 708 is used to indicate that a transaction has been decreased in quantity and also scheduled later in date/time. Visual change indicator 710 is used to indicate that a transaction has been scheduled earlier in date/time.

Visual change indicator 712 is used to indicate that a transaction has been scheduled later in date/time. Visual change indicator 714 is used to indicate that a new transaction has been created with the quantity and at the date/time as shown as part of an interactive time line visualization. Visual change indicator 716 is used to indicate that a transaction has been increased in quantity. Visual change indicator 718 is used to indicate that a transaction has been increased in quantity and also scheduled earlier in date/time. Visual change indicator 720 is used to indicate that a transaction has been increased in quantity and also scheduled later in date/time.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

Communication media may be embodied by computer readable instructions, data structures, program modules, or other data in a modulated data signal, such as a carrier wave or other transport mechanism, and includes any information delivery media. A modulated data signal may describe a signal that has one or more characteristics set or changed in such a manner as to encode information in the signal. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 8:
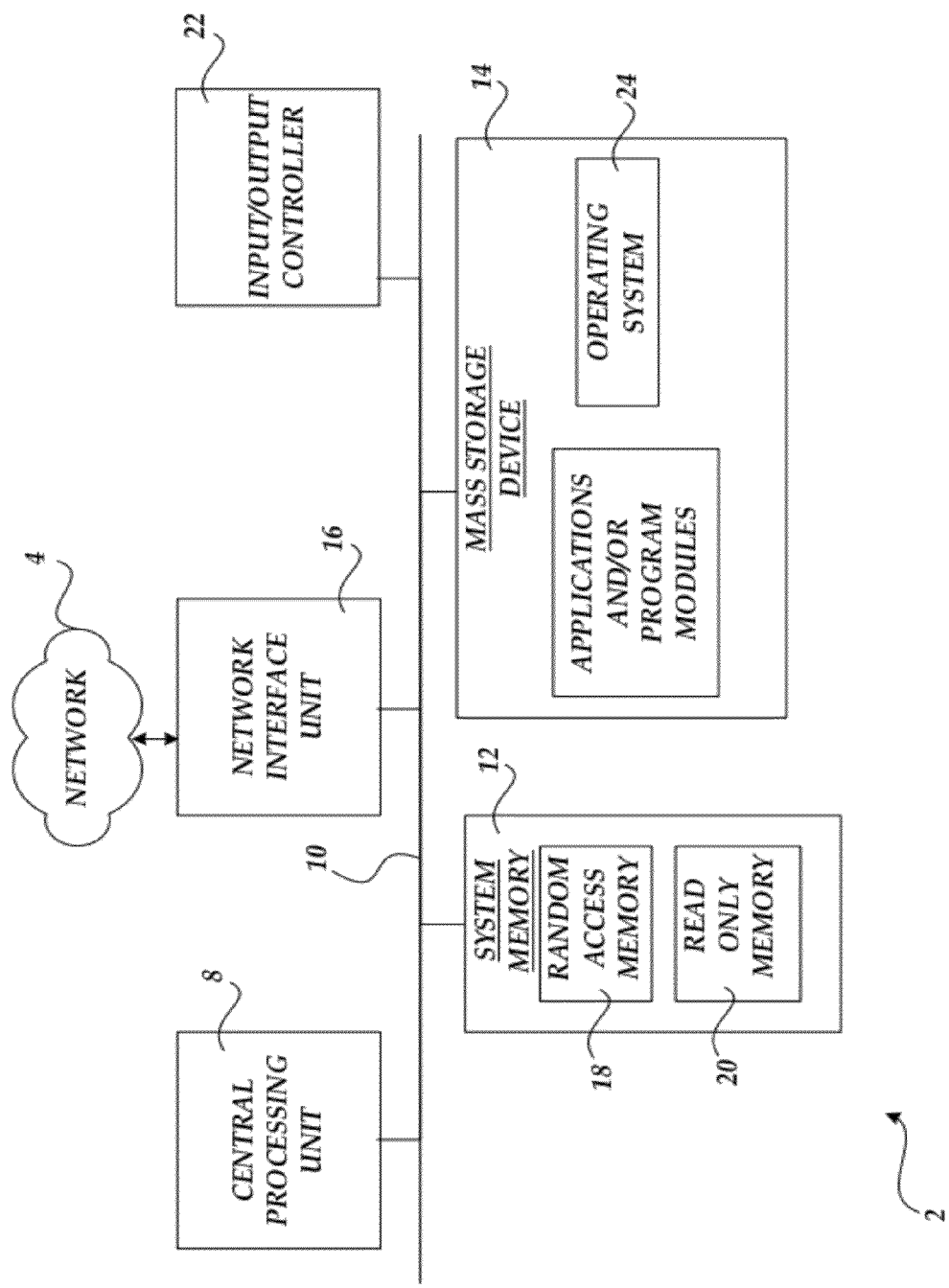
FIG. 8 is a block diagram illustrating an exemplary computing environment for implementation of various embodiments described herein.

Referring now to FIG. 8, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 8, an illustrative operating environment for embodiments of the invention will be described. As shown in FIG. 8, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of visualizing data comprising:
providing a data visualization interface including an interactive graphical representation, the interactive graphical representation including time parameters and data values corresponding to one or more data types;
populating portions of the visualization interface with data of one or more of the data types using the interactive graphical representation to display one or more of the data types;
detecting changes to adjustable data portions of the interactive graphical representation and automatically adjusting the display of the interactive graphical representation based in part on detected changes; and,
displaying one or more visual change indicators for adjusted data portions of the interactive graphical representation, wherein the interactive graphical representation comprises a step line graphical representation used in part to identify periods of time during which a step falls below or reaches zero using a first visual representation for a forecast step, a second visual representation for a booked transaction step, and a third visual representation for a change step.

2. The method of claim 1, further comprising adjusting the display of the interactive graphical representation to present data levels affected by the adjustment of one or more data adjustable values as part of one or more of a forward looking data point adjustment and backward looking data point adjustment.

3. The method of claim 1, further comprising adjusting the display of the interactive graphical representation to present data levels affected by the adjustment of one or more adjustable data values as part of one or more of an upward data point adjustment and downward data point adjustment.

4. The method of claim 1, wherein the interactive graphical representation comprises the step line graphical representation that includes filled and patterned step line portions including different presentation colors for each type of data, responsive to zoom and other control inputs.

5. The method of claim 1, further comprising providing the visual change indicators based in part on an adjustment type, the visual change indicators including one or more of an increased value indicator, a decreased value indicator, an adjustable value indicator, and a non-adjustable value indicator.

6. The method of claim 5, further comprising providing the visual change indicators based in part on an adjustment type, the visual change indicators further including one or more of a new supply indicator, a deleted supply indicator, and a forecast indicator.

7. The method of claim 6, the interactive graphical representation further comprising a first axis including dates over some period of time and a second axis including data values of one or more of forecast values, booked transaction values, and change values, each step portion colored using a distinct color for a forecast, a booked transaction, and change.

8. The method of claim 1, wherein the interactive graphical representation comprises the step line graphical representation used in part to visualize comparisons with target levels, including interacting with aspects of the step line graphical representation to identify change consequences based in part on using a unique application defined value to reference a document that represents a transaction.

9. The method of claim 8, further comprising transmitting user interactions back to a resource planning system for one or more of processing, validation, application, and rejection.

10. A computer-implemented visualization interface that uses at least one processor and memory to provide data visualizations by:
- providing an interactive time line graphical representation including a time scale and data values associated with one or more data types;
- rendering portions of the time line graphical representation using data of one or more data types including a first type of data, a second type of data, and a third type of data;
- receiving change inputs to adjustable data points of the time line graphical representation and automatically adjusting the rendering based in part on the change inputs; and,
- symbolizing a change to one or more of the adjustable data points using one or more visual change cues for the corresponding adjustable data points of the time line graphical representation, wherein the time line graphical representation comprises a step line graphical representation used in part to identify periods of time during which a step falls below or reaches zero using a first visual representation for a forecast step, a second visual representation for a booked transaction step, and a third visual representation for a change step.

11. The computer-implemented user interface of claim 10, further to provide aspects of a data visualization by adjusting the rendering of step portions of the time line graphical representation as part of a visualizing effects of data point adjustments, including capturing and communicating change transactions using a communication port and data set.

12. The computer-implemented user interface of claim 10, further to provide aspects of the data visualization by providing a tabular view of the time line data adjacent to the time line graphical representation.

13. The computer-implemented user interface of claim 10, further to provide aspects of a data visualization by enabling adjustment of adjustable time line points and providing change symbols including one or more of an upward change symbol, a downward change symbol, a forecast symbol, and a new quantity symbol, wherein each symbol can be coupled for display with other symbols.

14. The computer-implemented user interface of claim 13, further to provide aspects of the data visualization by filling and patterning step portions including using a different color for each type of data including forecast data, changed data, and booked transaction data.

15. The computer-implemented user interface of claim 10, further to provide aspects of a data visualization by using the time line graphical representation to visualize comparisons with target levels, including interacting with adjustable levels to visualize change in level consequences of data adjustments.

16. The computer-implemented user interface of claim 15, further to provide aspects of the data visualization by using visual change indicators to indicate one or more of a data point moved forward in time, a data point moved backward in time, a data point moved to a higher value, and a data point moved to a lower value.

17. A system comprising:
- processing and memory resources used in part to provide visualization data; and
- a visualization component to:
  - display a data visualization including an interactive time line representation of data values plotted over time, the data values including one or more of forecast values, change values, and booked transaction values, wherein visual symbols are used to indicate one or more of a movement of a data point forward in time, a movement of a data point backward in time, a movement of a data point to a higher value, and a movement of a data point to a lower value; and,
  - dynamically update the interactive time line representation as a user interacts with adjustable time line portions, wherein the time line graphical representation comprises a step line graphical representation used in part to identify periods of time during which a step falls below or reaches zero using a first visual representation for a forecast step, a second visual representation for a booked transaction step, and a third visual representation for a change step; and,
- a display component to display the data visualization.

18. The system of claim 17, further comprising a client including the visualization component that includes a changes element to contain one or more of a new type, a deleted type, a supply change type, a rescheduled type, and a reverted type.

19. The system of claim 17, further comprising a planning application and a unique application defined value used to reference a document that represents a transaction used as part of providing the interactive time line representation.

20. The system of claim 17, further configured to provide aspects of the data visualization by using the time line representation to visualize comparisons with target levels including using adjustable levels to visualize change in level consequences of data adjustments.

* * * * *